(12) United States Patent
Fegyver et al.

(10) Patent No.: US 10,089,753 B1
(45) Date of Patent: Oct. 2, 2018

(54) METHOD, SYSTEM AND COMPUTER-READABLE MEDIUM FOR CAMERA CALIBRATION

(71) Applicant: Almotive Kft., Budapest (HU)

(72) Inventors: Zoltán Fegyver, Földes (HU); Kristóf Várszegi, Szentendre (HU)

(73) Assignee: Almotive Kft., Budapest (HU)

( * ) Notice: Subject to any disclaimer, the term of this patent is extended or adjusted under 35 U.S.C. 154(b) by 5 days.

(21) Appl. No.: 15/641,491

(22) Filed: Jul. 5, 2017

(51) Int. Cl.
| | |
|---|---|
| G06T 7/80 | (2017.01) |
| G06T 7/194 | (2017.01) |
| G06T 5/30 | (2006.01) |
| G06K 9/46 | (2006.01) |
| G06K 9/50 | (2006.01) |
| G06K 9/48 | (2006.01) |
| G06K 9/52 | (2006.01) |

(52) U.S. Cl.
CPC ............... G06T 7/80 (2017.01); G06K 9/468 (2013.01); G06K 9/48 (2013.01); G06K 9/50 (2013.01); G06K 9/52 (2013.01); G06T 5/30 (2013.01); G06T 7/194 (2017.01); *G06K 2009/4666* (2013.01); *G06T 2207/20036* (2013.01); *G06T 2207/30252* (2013.01)

(58) Field of Classification Search
CPC ........... G06K 9/468; G06K 9/48; G06K 9/50; G06K 9/52; G06T 5/20; G06T 5/30; G06T 7/194; G06T 7/11; G06T 7/155; G06T 7/70; G06T 7/80; G06T 2207/20036; G06T 2207/30252
See application file for complete search history.

(56) References Cited

U.S. PATENT DOCUMENTS

| | | | | |
|---|---|---|---|---|
| 6,768,509 B1* | 7/2004 | Bradski | ..................... | G06K 9/48 348/187 |
| 2003/0086603 A1* | 5/2003 | Davidson | .................. | G06T 3/40 382/154 |
| 2004/0042649 A1* | 3/2004 | Arai | ..................... | G01B 11/2504 382/154 |
| 2005/0207640 A1* | 9/2005 | Kim | .......................... | G06T 7/80 382/154 |
| 2010/0082281 A1* | 4/2010 | Nakamura | ................. | G06T 7/80 702/95 |
| 2010/0194886 A1* | 8/2010 | Asari | ......................... | G06T 7/33 348/148 |
| 2012/0320190 A1* | 12/2012 | Natroshvili | ............. | G06T 5/006 348/135 |
| 2015/0254853 A1* | 9/2015 | Tanaka | ...................... | B60R 1/00 348/148 |
| 2017/0032526 A1* | 2/2017 | Gao | ......................... | B60R 11/04 |
| 2017/0124710 A1* | 5/2017 | Kwon | ................... | G06K 9/3216 |

* cited by examiner

*Primary Examiner* — Ryan P Potts
(74) *Attorney, Agent, or Firm* — Wood Herron & Evans LLP

(57) ABSTRACT

The invention provides a method, a system and a computer-readable medium for calibrating a camera by using a multi-pattern calibration rig, each pattern being repetitive and comprising calibration shapes, wherein the following steps are carried out: capturing an image of the multi-pattern calibration rig with the camera, segmenting contours of the imaged calibration shapes, building groups of coherent contours based on the similarity of their shapes and their distances from each other, and identifying the positions of the patterns in the image based on the contour groups.

13 Claims, 16 Drawing Sheets

METHOD, SYSTEM AND COMPUTER-READABLE MEDIUM FOR CAMERA CALIBRATION

TECHNICAL FIELD

The present disclosure relates to a method, a system and a computer-readable medium for camera calibration by using a multi-pattern calibration rig. A non-limiting example of applying the camera calibration is that of a vehicle, and more particularly to calibrate cameras of an autonomous vehicle during assembly.

BACKGROUND ART

In recent times, camera based applications have gained popularity in numerous fields such as security systems, traffic surveillance, robotics, autonomous vehicles, etc. The camera calibration is imperative in running machine vision-based applications. The camera calibration is a process of obtaining camera parameters to determine (mathematically and accurately) how a three-dimensional (3D) environment is projected onto the camera's two-dimensional (2D) image plane without being affected by any lens distortion. The camera parameters may be, for example, a focal length, a skew, a distortion, etc. Typically, the camera parameters are determined by capturing multiple images of a calibration pattern from different views. The projections of certain key points in the calibration pattern (such as, inner corners in case of a checkerboard pattern) are then detected on the captured images. Then the projected key points of the calibration pattern are used by a conventional camera calibration algorithm for calibrating the camera. There are various mathematical models, for example, an OpenCV pinhole camera model (OpenCV Dev Team, 2016, Camera Calibration and 3D Reconstruction; available at: http://docs.opencv.org/2.4/modules/calib3d/doc/camera_calibration_and_3d_reconstruction.html) for cameras with a narrow field-of-view, a OCam-Calib model (Davide Scaramuzza, 2006, OCamCalib: Omnidirectional Camera Calibration Toolbox for Matlab; available at: https://sites.google.com/site/scarabotix/ocamcalib-toolbox) for catadioptric and fisheye cameras, etc., which use different kinds of camera parameters for camera calibration.

As mentioned above, the most widely used camera calibration methods process images taken from multiple views of a calibration pattern. However, capturing a sequence of such images may take too long and may be too complicated to fit into a mass production factory. Camera calibration algorithms typically require about 10-30 images of a calibration pattern. Acquiring multiple images and appropriately repositioning the calibration pattern (or the camera) multiple times after taking a picture is time-consuming, and requires undivided attention of a camera operator. Conventional pattern detection algorithms employ corner detection to locate a calibration object within the captured image. These pattern detection algorithms are designed to detect only a single board containing a particular calibration pattern. Additionally, the detection often fails due to illumination variation and noise present during the image capturing process.

One example of a calibration pattern typically used for calibrating cameras is a checkerboard. Corners and edges of the checkerboard are two most important features. Typical methods used for detecting corners of checkerboards include Harris & Stephens corner detection algorithm, smallest univalue segment assimilating nucleus (SUSAN) corner detection algorithm, X-corner detection algorithm, etc. Hough transformation may be used on the edges to identify a proper set of lines and to locate the checkerboard pattern. Another approach for locating a checkerboard is based on calculating a count of internal holes in an image of a checkerboard for a particular size of the checkerboard. Morphological operations may be applied on the input image for detecting contours and a hierarchical tree is built from the contours. The checkerboard is considered to be correctly identified when a contour having a predetermined number of holes is found. Another widely used calibration pattern is of ellipses, however corners and lines are not present in that case.

Autonomous vehicles operating with minimal human intervention may be used in transporting people and objects. Typically, some autonomous vehicles require an initial input from an operator, while some other designs of the autonomous vehicles are under constant operator control. Some autonomous vehicles can be operated entirely by remote. Conventional autonomous vehicles are equipped with multiple cameras for facilitating control of operation of the autonomous vehicle. Hence, each camera is to be calibrated to ensure reliable and secure operation of the autonomous vehicle.

A method is disclosed in U.S. Pat. No. 6,768,509 B1 for determining points of interest on an image of a camera calibration object, preferably a checkerboard-pattern. Contours of the calibration shapes are extracted to this end, however, the known method is not suitable for calibrating with multiple calibration patterns.

Calibration of a multi-camera system has already been disclosed in US 2016/0073101 A1. The disclosed multi-target camera calibration is achieved by using multiple cameras that capture one or more images of multiple targets. Images of multi-board targets may also be captured. However, an image of only one checkerboard is captured at a time. These known techniques include stitching together each checkerboard of the multi-board target together by identifying individual boards by their location relative to other boards. Each checkerboard of the multi-board target may be captured individually, and subsequently suppressed while other checkerboards are captured. Then, checkerboard images may be stitched together for calibration based on their relative positions. Thus, the known system does not eliminate the above mentioned deficiencies of individual pattern processing.

Once multiple calibration patterns are captured in an image, and the positions of these patterns in the image are determined, the camera can be calibrated by means of known techniques, e.g. by means those disclosed in:

Zhengyou Zhang (2009); A flexible new technique for camera calibration; IEEE Transactions on Pattern Analysis and Machine Intelligence, 22(11), pp. 1330-1334;

Jean-Yves Bouguet (2015); Camera Calibration Toolbox for Matlab; available at: http://www.vision.caltech.edu/bouguetj/calib doc/;

Scaramuzza, D., Martinelli, A. and Siegwart, R. (2006); A Toolbox for Easy Calibrating Omnidirectional Cameras; Proceedings to IEEE International Conference on Intelligent Robots and Systems (IROS 2006).

However, the prior art is deficient in techniques that would improve speed of camera calibration by allowing a quick and reliable position-determining for multiple patterns in a captured image, especially for autonomous vehicles during assembly in mass manufacturing. The prior art is also deficient in techniques that improve robustness to noise and illumination variations during the camera calibration.

SUMMARY OF THE INVENTION

It is an object of the invention to address and improve the aforementioned deficiencies in the prior art.

It is an object of the invention to calibrate at least one camera—especially for an autonomous vehicle—by using a multi-pattern calibration rig.

A calibration target comprising multiple patterned panels is provided. The calibration target is a multi-panel—more exactly a multi-pattern—calibration rig holding the patterned panels. The multi-pattern calibration rig comprises a supporting structure holding at least two patterned panels. The patterned panels are provided with any kind of repetitive calibration pattern of a calibration shape. Repetitive in this context means that the pattern comprises identical shapes arranged with regular spacings. For example, a patterned panel with a checkerboard pattern may have black or white squares, a patterned panel with a grid of circles may have black or white circles, etc. A camera installed in an autonomous vehicle captures an image of the multi-pattern calibration rig. Hence, multiple patterned panels comprising identical and/or different repetitive calibration patterns are captured in a single input image. In an example, the calibration rig may be positioned at a distance of about, for example, 10 meters from the autonomous vehicle.

The input image captured by the camera is preferably pre-processed to segment images of calibration shapes from a background of the input image. For example, adaptive thresholding techniques may be used for segmenting the calibration shapes by removing variations in illumination.

The calibration shapes are segmented and preferably also filtered to extract contours of the imaged calibration shapes. Distorted contours which do not fulfil a-priori requirements based on properties of the contours are filtered out. Furthermore, the contours may be filtered based on a shape of a contour, a size of a contour, etc. For example, the contours of any shape may be filtered into small or large contours; circle-shaped contours may be filtered into elongated, partially circular, or non-circular contours, etc.

Next, groups are built from contours based on their shapes and relative distances (coherent contours'). The groups are formed based on a-priori knowledge of the repetitive pattern. Preferably, a set of boundaries of the formed groups is output for identifying a position of each pattern, and in turn the patterned panel, in the input image. Hence, the position of each pattern in the image of the multi-pattern calibration rig corresponds to and is identified as the position of the respective contour group.

For a preferred application, the camera or cameras to be calibrated are those of an autonomous vehicle, being essentially a car, a truck, any two-wheeled or four-wheeled vehicle, a quadcopter or a drone configured for traffic control, etc. The autonomous vehicle primarily transports people and objects with or without a driver. That is, a self driving car is understood to be an autonomous vehicle. Also a car that is self-driving in some situations, but driven by a human driver in other situations, is understood to be an autonomous vehicle in this context.

The autonomous vehicle may also control traffic congestion, ensure pedestrian safety, detect potholes in a navigation path of the autonomous vehicle, alert the driver on incorrect lane departure and perform many assisting functions to the driver that help him to drive safely and efficiently in accordance with the invention.

Thus, according to a first aspect, a method is provided for calibrating a camera by using a multi-pattern calibration rig, each pattern being repetitive and comprising calibration shapes, the method comprising the steps of
capturing an image of the multi-pattern calibration rig with the camera,
segmenting contours of the imaged calibration shapes,
building groups of coherent contours based on the similarity of their shapes and their distances from each other, and
identifying the positions of the patterns in the image based on the contour groups.

Preferably, any two contours, each having a respective area and an enclosing circle with a respective radius, belong to the same group if at least the following conditions are fulfilled:
  the smaller one of the two areas is larger than 50% of the other area,
  the smaller one of the two radii is larger than 50% of the other radius, and
  the distance of the closest points of the contours is less than 150% of the larger one of the two radii. Our experiments has shown that such a set of conditions sufficiently and appropriately groups the coherent contours. It is conceivable, that depending on the circumstances (e.g. lighting, distortion, type of pattern used) even narrower conditions may be suitable to achieve this object, and such more strict conditions are within the above range and thereby within the scope. Of course, in the case if the two compared areas or the two compared radii are of identical size, the above respective conditions are also met, i.e. in case of equal sizes any of the two can be considered as a 'smaller' or a 'larger' one.

According to a second aspect, a camera calibration system is provided, comprising at least one camera and a multi-pattern calibration rig, each pattern being repetitive and comprising calibration shapes, wherein the system also comprises a computer device being connected to the at least one camera and being adapted for carrying out the steps of the above method. The computer device can be of any conceivable type, and it can be integrated into the camera or can be a separate unit or distributed on a network, etc.

According to a third aspect, a non-transitory computer-readable medium is provided for calibrating a camera with a multi-pattern calibration rig, each pattern being repetitive and comprising calibration shapes, the medium comprising instructions stored thereon, that when executed on a processor, perform the steps of the above method.

The invention has considerable advantages. The invention requires only a single calibration target to be captured by the camera in a single image. There is no requirement of precise predefined positioning of the calibration target nor a rotating machinery for moving the camera being calibrated. Hence, the camera calibration system is less prone to positioning deviations as the method does not require repositioning or rotating the calibration target or the camera. Further, the invention does not require an exact knowledge of a relative position and an orientation of the calibration patterns of the calibration target. Each calibration pattern captured in the image is detected and processed independently of their respective position and orientation. The camera calibration system is substantially flexible in including multiple calibration patterns in a single field of view of the camera without the need of using multiple calibration targets. Hence, the present invention helps e.g. for automotive manufacturers in reducing production time and minimizing production errors.

A preferred embodiment of the invention is considered to be assembling of an autonomous car on a conveyor belt system of an automotive assembly plant. The autonomous car comprises cameras installed at multiple locations, for example, near headlights or tail lights, near handles of doors, on a roof of the autonomous car, etc. Two multi-pattern calibration rigs may be positioned about 10 meters away from the autonomous car. One multi-pattern calibration rig is positioned facing a front side of the autonomous car, and the other multi-pattern calibration rig is positioned facing a rear side of the autonomous car. While the autonomous car is being assembled on the conveyor belt system, the cameras capture images of the multi-pattern calibration rigs. The images are preferably pre-processed to segment calibration shapes from a background in the images, for example, parts not related to patterned panels of the multi-pattern calibration rigs. Contours of the calibration shapes are segmented and filtered and coherent contours are grouped together based on their shapes and/or positions. A position of each pattern, and in turn that of the respective panel is identified based on the contour groups, thereby calibrating each camera of the autonomous car. The invention makes it possible to time-efficiently calibrate the cameras of the autonomous car during the assembling stage, thereby making it suitable to be employed for mass production.

Further preferred embodiments are described and defined in the dependent claims.

DETAILED DESCRIPTION OF EMBODIMENTS

The present disclosure provides a camera calibration method, system and a computer program product on a non-transitory computer-readable medium for calibrating a camera. In the following, as a non-limiting example, calibrating at least one camera of an autonomous vehicle is described. The camera calibration comprises a multi-pattern calibration rig and one or more cameras installed in the autonomous vehicle. The multi-pattern calibration rig comprises multiple patterned panels that are used for calibrating the cameras of the autonomous vehicle. In an example implementation, the cameras are calibrated while assembling the autonomous vehicle on a conveyor belt system in an automotive assembly plant. The camera to be calibrated captures an image of the multi-pattern calibration rig holding the patterned panels. The image is preferably pre-processed to segment calibration shapes from a background of the image. Contours of the imaged calibration shapes are segmented. Preferably, contours are also filtered based on predetermined filtering criteria. The contours are grouped based on the similarity of their shapes and their distances from each other. A position of each pattern (and in turn each patterned panel) on the multi-pattern calibration rig is identified based on the contour groups. In accordance with the principles of the present invention as described herein, a time-efficient and robust camera calibration process suitable for factory applications is achieved.

Figure 1A:
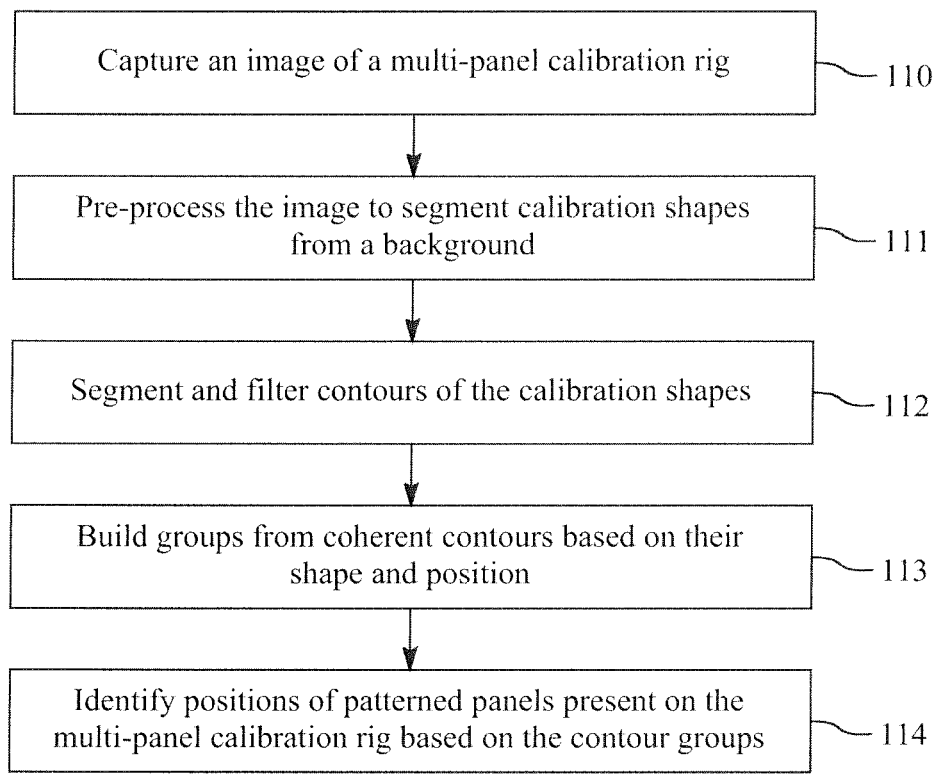
FIG. 1A demonstrates an embodiment 11 of a method for calibrating at least one camera of an autonomous vehicle, in accordance with the invention as a flow diagram.

FIG. 1A demonstrates an embodiment 11 of a method for calibrating at least one camera of the autonomous vehicle, in accordance with the invention as a flow diagram. The method could be implemented in a system identical or similar to embodiment 20, 21, or 50 in FIG. 2A, FIG. 2B, or FIG. 5 for example, as discussed in the other parts of the description. An end-user of the method could use a user interface identical or similar to that disclosed with embodiments 15, 16, 17, 18, 30, 60, and 72 in FIGS. 1E, 1F, 1G, 1H, 3, 6, and 7B respectively.

The method for calibrating the camera of the autonomous vehicle inventively comprises the multi-pattern calibration rig comprising multiple patterned panels. In an example, the multi-pattern calibration rig comprises at least two patterned panels. The patterned panels are provided with a calibration pattern comprising calibration shapes. The calibration pattern is a well-defined repetitive pattern. The calibration shapes may refer to a union of similar-shaped and geometrically well-aligned objects. The calibration shapes may be, for example, squares, circles, ellipses, etc. In an example, the calibration pattern may be a checkerboard pattern comprising black squares or white squares as calibration shapes. In another example, the calibration pattern may be a grid of circles comprising calibration shapes made of circles of a particular shape, a size, or a color.

In step 110, the camera captures an image of the multi-pattern calibration rig. The captured image is used as an input image for performing the calibration of the camera. The camera may be, for example, a pinhole camera, a digital camera, a video camera, a remote camera, a lipstick camera, cameras with CMOS sensors, cameras with CCD sensors, a short range camera, a long range camera, and/or a fish eye camera and the like. In an embodiment, the camera may be positioned, for example, on a front surface, a rear surface, a top surface and/or a bottom surface of the autonomous vehicle for capturing the image of the multi-pattern calibration rig. For example, the camera may be positioned near headlights or tail lights, on a dashboard facing in the direction of vehicle movement, on a roof or a hood of the autonomous vehicle, on the dashboard facing a driver of the autonomous vehicle, on the driver's seat, near rear view mirrors, at one or each door of the autonomous vehicle, etc.

In an embodiment, there may be multiple cameras installed at multiple locations in the autonomous vehicle for simultaneously capturing images of multiple multi-pattern calibration rigs and simultaneously calibrating all of the cameras. In an example implementation, there may be multiple multi-pattern calibration rigs placed at different locations in a conveyor belt system used for assembling the autonomous vehicle. For example, the multi-pattern calibration rig may be positioned about 10 meters away from the autonomous vehicle comprising the cameras.

In an optional step 111, the input image is preferably pre-processed to segment the imaged calibration shapes, for example, squares, circles, etc., from a background of the input image. Such a pre-processing is not necessary if the imaging already encompasses an automatic segmenting of the imaged calibration shapes. The calibration shapes in the input image are identified, thereby facilitating segmenting of the calibration shapes from the background of the input image. In an embodiment, the calibration shapes are clustered based on a-priori knowledge of a shape and/or an alignment of the calibration shapes. The calibration pattern of each patterned panel held in the multi-pattern calibration rig has a background and a foreground. The background extends to form a border around the foreground. The foreground is composed of the calibration shapes which are similar-shaped objects with a predefined geometry and relative position to each other as predefined. For example, if the calibration pattern comprises square calibration shapes, then the foreground is formed by the square shapes and the background is formed by other components in the image that form a border around the square shapes. The segmenting of imaged calibration shapes from the background, preferably comprises generating a binary image in which the background is represented with one binary value (e.g. black) and the imaged calibration shapes are represented by the other binary value (e.g. white).

In step 112, segmenting and optionally also filtering of contours of the imaged calibration shapes is performed. Once the foreground comprising the calibration shapes is segmented from the background, properties of contours are preferably measured. The properties of contours are measured based on, for example, an area, a distance from another contour, an estimated enclosing radius of calibration shapes, etc. A contour property defines characteristics and features of the contours based on the a-priori knowledge of the calibration shapes. The contour property may be, for example, a contour area, a convex hull contour boundary, a contour shape, etc. The measured contour properties are used for filtering the contours. For example, if a contour is measured to be too circular as compared to the a-priori knowledge of a shape of the contour, the contour is considered to be distorted and is filtered out from a contour set.

In step 113, groups are built from the coherent contours based on a shape and a position (i.e. relative distance) of each contour. The coherent contours are grouped together based on the a-priori knowledge of the calibration pattern of each patterned panel placed on the multi-pattern calibration rig. For example, two contours belong to a contour group if the contours are similar in shape and/or size and a relative position or distance between the contours suggests that both contours are closely positioned.

In an example implementation, a nearest neighbor clustering algorithm may be used for grouping the coherent contours. A predefined number of imaged calibration shapes are used to build the calibration pattern, based on the a-priori knowledge of the imaged calibration pattern. When a group of contours having the predefined number—or with a tolerance of ±10% of the predefined number—of the calibration shapes is identified using the nearest neighbor clustering algorithm, the group is determined as a valid group, i.e. a calibration target. A bounding polygon for the contour group is calculated by taking a convex hull of the group. As a result, the convex hull in the shape of the bounding polygon surrounds each set of the coherent contours to represent different calibration targets in the input image.

In step 114, a position of each pattern (and in turn that of each patterned panel) in the image is identified based on the contour groups, by which the positions of the patterns/panels on the multi-pattern calibration rig can be calculated. The convex hull surrounding each set of the contour groups represents the imaged calibration targets formed by the patterned panels placed on the multi-pattern calibration rig. Once the position of each pattern (or patterned panel) on the multi-pattern calibration rig is correctly identified in the input image, all necessary information is present for calibrating the camera according to any of the known calibration methods.

Any features of embodiment 11 may be readily combined or permuted with any of the other embodiments 12, 13, 14, 15, 16, 17, 18, 20, 21, 30, 40, 50, 60, 71, 72, 81, 82, 83, 91, 92, and/or 93 in accordance with the invention.

Figure 1B:
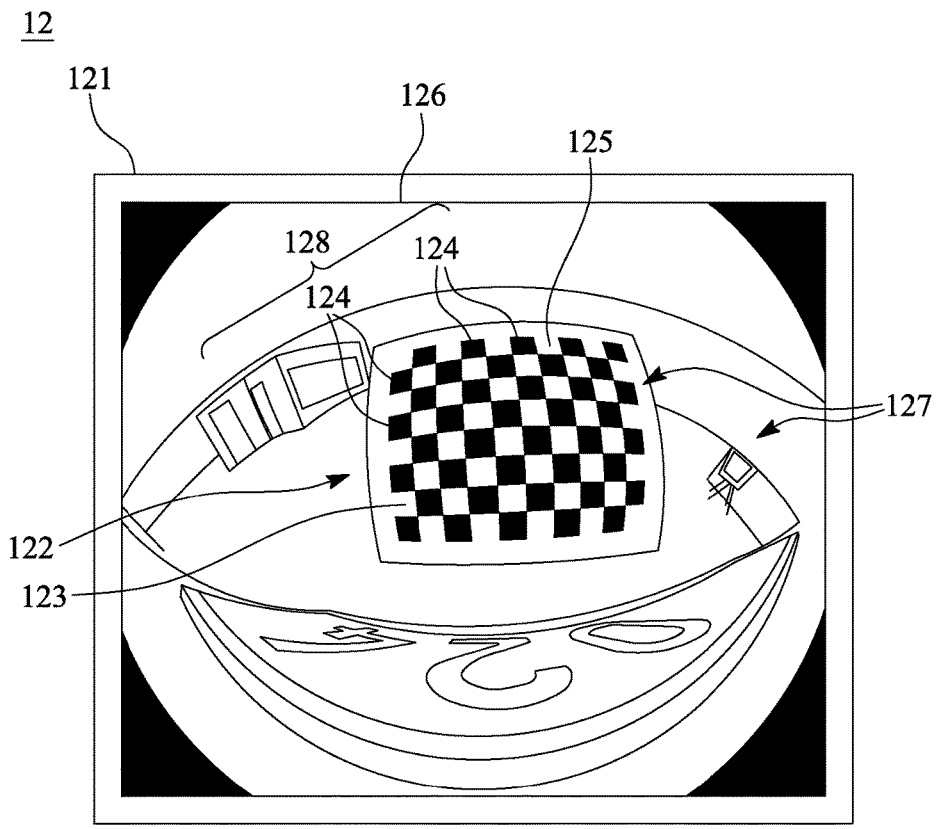
FIG. 1B demonstrates an embodiment 12 of a user interface of a computer program product showing an imaged patterned panel as a screen shot diagram.

FIG. 1B demonstrates an embodiment 12 of a user interface 121 of a computer program product showing a patterned panel 122, as a screen shot diagram. In the depicted explanatory implementation, one patterned panel 122 made of a checkerboard calibration pattern 123 is used for calibrating the camera of the autonomous vehicle. The calibration pattern 123 comprises calibration shapes 124, for example, black squares on a white board 125. The camera of the autonomous vehicle to be calibrated captures an image 126 of the patterned panel 122. The captured image 126 shown in the user interface 121 is used as an input image 126 for calibrating the camera. As shown in FIG. 1B, the image 126 captured by the camera has a fish-eye distortion that creates a wide panoramic or a hemispherical image. The image 126 of the calibration pattern 123 may be distorted due to, for example, a perspective effect, a position and/or a sharp angle of the patterned panel 122, a lens of a fish-eye camera, etc. In this example, a background 127 of the input image 126 contains the white board 125 along with an environment surrounding the white board 125. A foreground 128 of the image 126 is formed by the imaged calibration shapes 124 (i.e. black squares) of a similar size on the white board 125. Although, the calibration shapes 124 appear distorted due to the fish-eye distortion the foreground 128 containing the calibration pattern 123 is correctly captured by the camera as each neighboring calibration shape 124 is similar in shape and size.

Any features of embodiment 12 may be readily combined or permuted with any of the other embodiments 11, 13, 14, 15, 16, 17, 18, 20, 21, 30, 40, 50, 60, 71, 72, 81, 82, 83, 91, 92, and/or 93 in accordance with the invention.

Figure 1C:
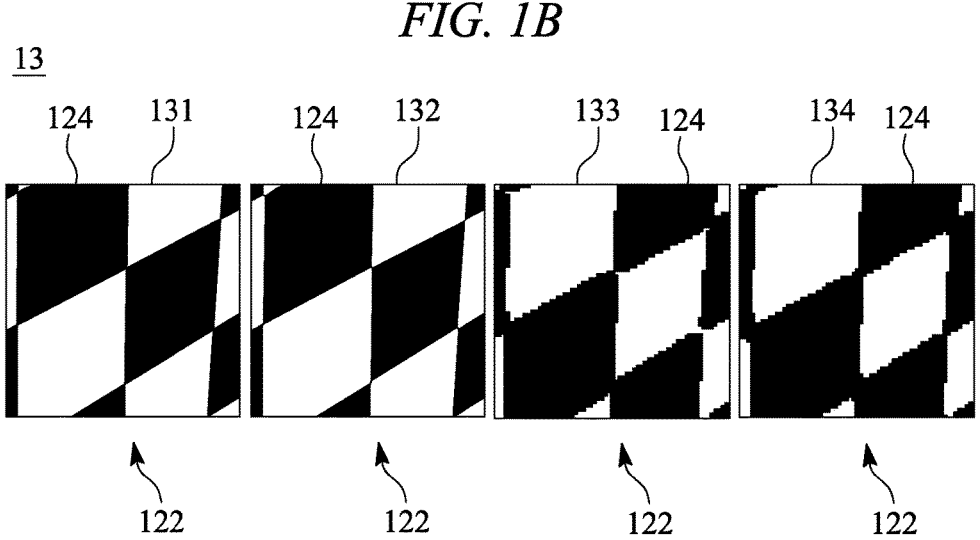
FIG. 1C demonstrates an embodiment 13 of a graphical representation of pre-processing stages of an input image captured by the camera to be calibrated, relating to an experiment showing the functioning of the invention.

FIG. 1C demonstrates an embodiment 13 of a graphical representation of pre-processing stages of the input image 126 relating to an experiment showing the functioning of the invention. Image 131 is an enlarged view of a part of the patterned panel 122 shown in FIG. 1B. In an embodiment, morphological erosion and dilation operations are performed to separate small connections between the calibration shapes 124 touching each other. Image 132 shows the part of the patterned panel 122 pre-processed by using morphological dilation. The morphological erosion and dilation operations ensure that the contours generated from the calibration shapes 124 are not corrupted. In an embodiment, the morphological operations are performed in predefined window sizes. For example, a small kernel may not break up all connections between neighboring calibration shapes 124, while a large kernel may destroy small calibration shapes 124 in the input image 126.

In an embodiment, adaptive thresholding is performed after the morphological enhancement of the input image 126. Image 133 shows the part of the patterned panel 122 pre-processed by using the adaptive thresholding. In an example, a Gaussian weighted average algorithm is used for performing the adaptive thresholding to eliminate effects of variation in illumination present in the input image 126. In an embodiment, a window size for the adaptive thresholding is predetermined. The window size is preferably set according to a maximum size of a single calibration shape 124 to avoid false holes appearing in the calibration shapes 124.

In an embodiment, another set of morphological or image processing operations are applied to the input image 126 to remove a spur and/or a bridge pixel. The morphological operations are performed for breaking any remaining connections between the calibration shapes 124. Image 134 shows the part of the patterned panel 122 after removal of any bridge pixels present in the input image 126. In an example, a pixel is considered to be the spur if the pixel has only one neighbor. In an example, a pixel is considered to be the bridge pixel when there are at least four transitions of set and unset neighboring pixels around the pixel.

Any features of embodiment 13 may be readily combined or permuted with any of the other embodiments 11, 12, 14, 15, 16, 17, 18, 20, 21, 30, 40, 50, 60, 71, 72, 81, 82, 83, 91, 92, and/or 93 in accordance with the invention.

Figure 1D:
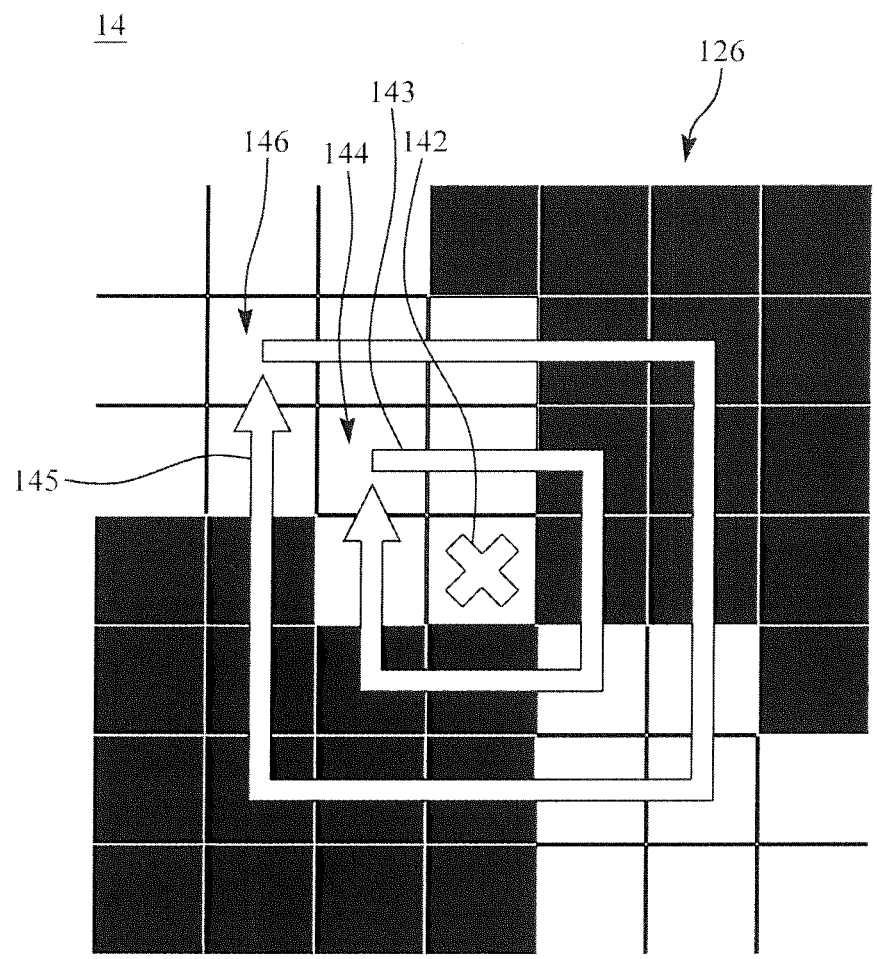
FIG. 1D demonstrates an embodiment 14 with a graphical representation of a bridge pixel, relating to an experiment showing the functioning of the invention.

FIG. 1D demonstrates an embodiment 14 with a graphical representation of a bridge pixel 142 present in the input image 126 relating to an experiment showing the functioning of the invention. The bridge pixel 142 may be defined by varying radii as shown in FIG. 1D. In one example, consider a loop 143 shown in FIG. 1D. Moving from a pixel 144 in a clockwise direction, there are 4 transitions of set and unset neighboring pixels around the pixel 144. In another example, consider another loop 145 shown in FIG. 1D. Moving from pixel 146 in a clockwise direction, there are again 4 transitions of set and unset neighboring pixels around the pixel 146. Thus, the pixel 142 is a bridge pixel according to both loops, which can thus be detected and deleted for breaking up any remaining connections between the imaged calibration shapes.

Any features of embodiment 14 may be readily combined or permuted with any of the other embodiments 11, 12, 13, 15, 16, 17, 18, 20, 21, 30, 40, 50, 60, 71, 72, 81, 82, 83, 91, 92, and/or 93 in accordance with the invention.

Figure 1E:
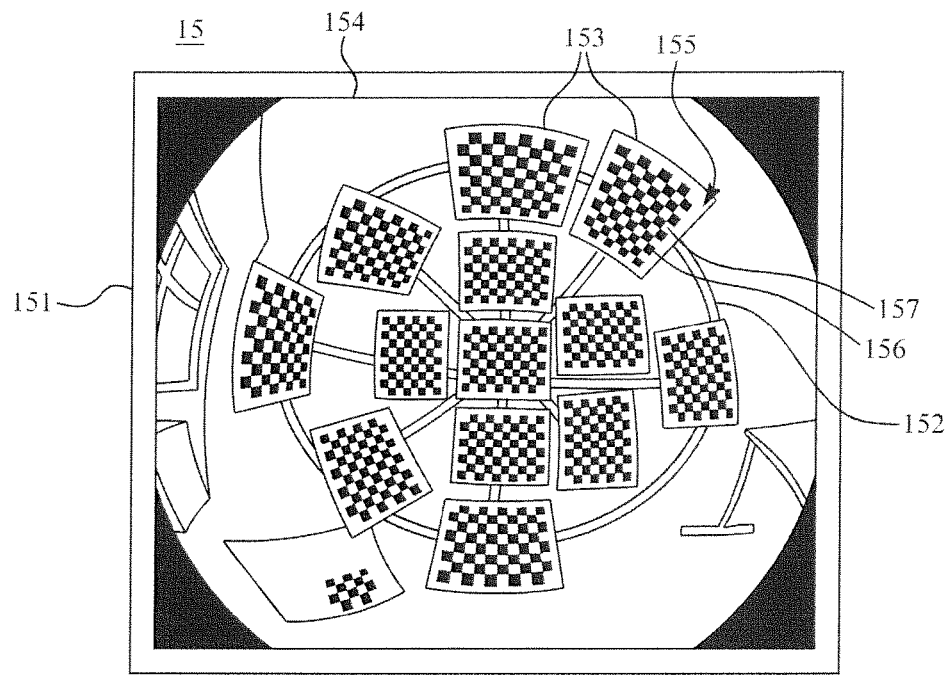
FIG. 1E demonstrates an embodiment 15 of a user interface of a computer program product showing a multi-pattern calibration rig comprising multiple patterned panels, in accordance with the invention as a screen shot diagram.

FIG. 1E demonstrates an embodiment 15 of a user interface 151 of a computer program product showing a multi-pattern calibration rig 152 holding multiple patterned panels 153, in accordance with the invention. In an example implementation, the camera positioned on a hood of the autonomous vehicle captures an input image 154 of the multi-pattern calibration rig 152 positioned about 15 meters away from the autonomous vehicle. In the example shown, the multi-pattern calibration rig 152 comprises 13 patterned panels of checkerboard calibration patterns 155 comprising black squares as calibration shapes 156 on a white board background 157. There is also a further checkerboard-like pattern in the bottom left side, however it is to be disregarded by the method as being a non-complete target pattern.

Any features of embodiment 15 may be readily combined or permuted with any of the other embodiments 11, 12, 13, 14, 16, 17, 18, 20, 21, 30, 40, 50, 60, 71, 72, 81, 82, 83, 91, 92, and/or 93 in accordance with the invention.

Figure 1F:
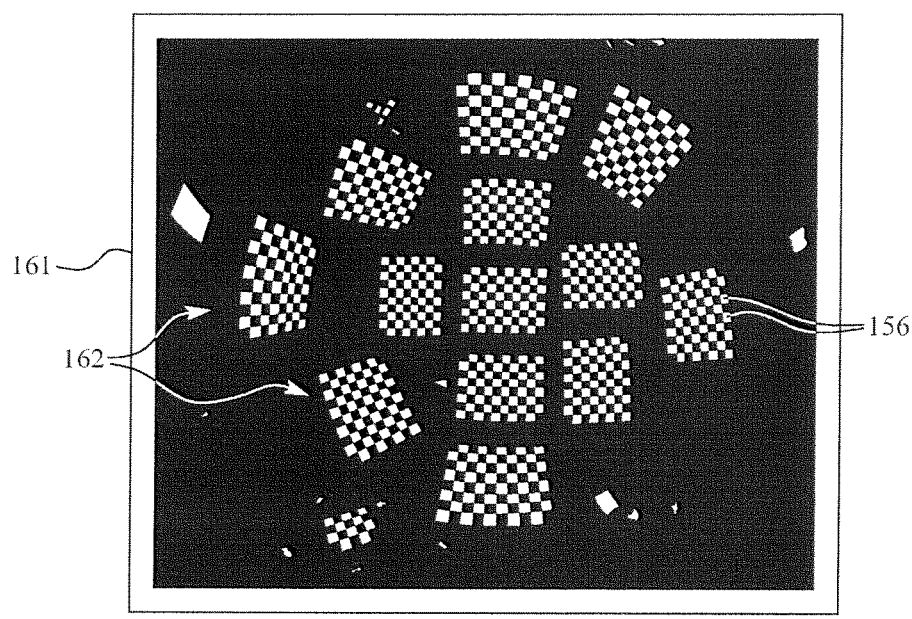
FIG. 1F demonstrates an embodiment 16 of a user interface of a computer program product showing filtered contours of the patterned panels, in accordance with the invention as a screen shot diagram.

FIG. 1F demonstrates an embodiment 16 of a user interface 161 of a computer program product showing filtered sets of contours 162 of the patterned panels 153, in accordance with the invention as a screen shot diagram. In spite of changes in luminance properties while capturing the input image 154, each calibration shape 156 is filtered into a respective contour 162. The contours 162 generated corresponding to each patterned panel 153 are shown corresponding to the input image 154 demonstrated in FIG. 1E.

Any features of embodiment 16 may be readily combined or permuted with any of the other embodiments 11, 12, 13, 14, 15, 17, 18, 20, 21, 30, 40, 50, 60, 71, 72, 81, 82, 83, 91, 92, and/or 93 in accordance with the invention.

Figure 1G:
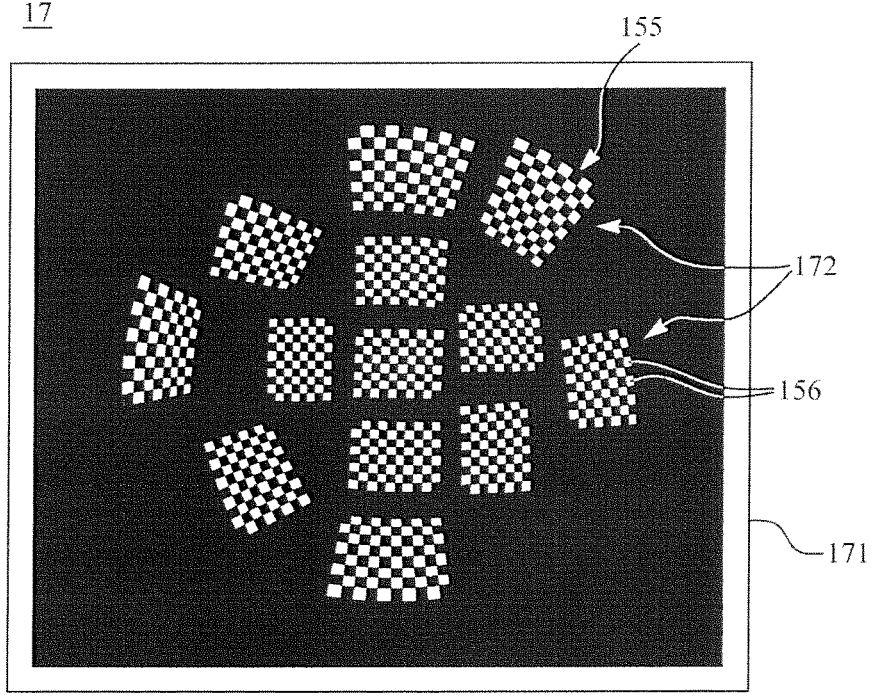
FIG. 1G demonstrates an embodiment 17 of a user interface of a computer program product showing contour groups, in accordance with the invention as a screen shot diagram.

FIG. 1G demonstrates an embodiment 17 of a user interface 171 of a computer program product showing contour groups 172, in accordance with the invention as a screen shot diagram. In an embodiment, a nearest neighbor clustering algorithm is employed for building the contour groups 172. In an embodiment, the contours 162 are grouped based on, for example, geometric properties, the a-priori knowledge of the calibration patterns 155, etc. The contour groups 172 are formed from groups comprising a pre-determined number of similar contours 162—so is the checkerboard-like pattern in the bottom left side filtered out. In an embodiment, a measurement of similarity between the contours 162 is based on, for example, an area, a distance, an estimated enclosing radius of the calibration shapes 156, etc.

Any features of embodiment 17 may be readily combined or permuted with any of the other embodiments 11, 12, 13, 14, 15, 16, 18, 20, 21, 30, 40, 50, 60, 71, 72, 81, 82, 83, 91, 92, and/or 93 in accordance with the invention.

Figure 1H:
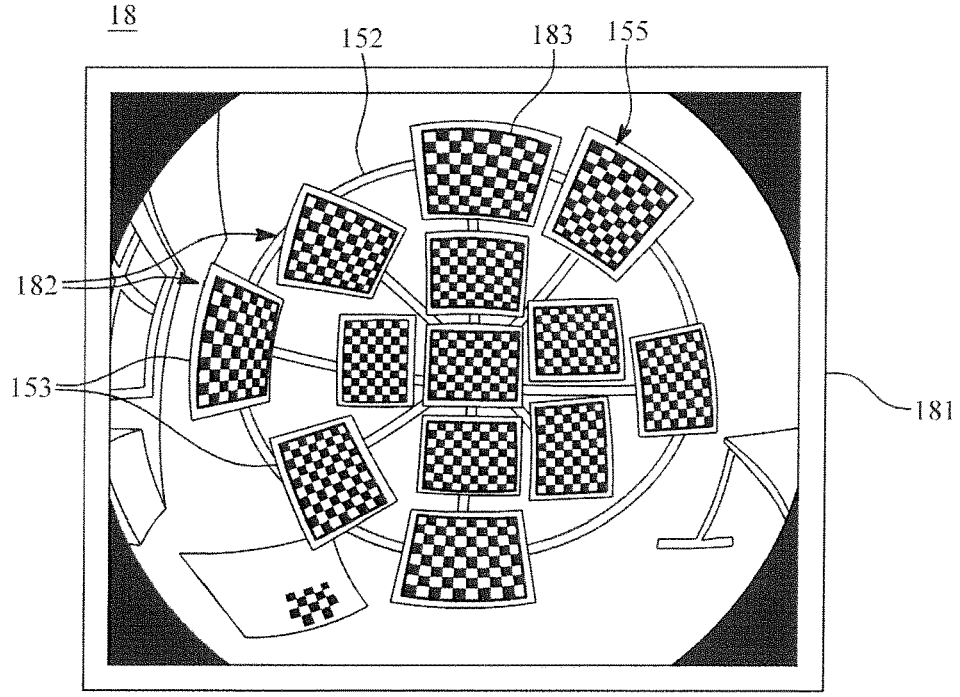
FIG. 1H demonstrates an embodiment 18 of a user interface of a computer program product showing identified positions of each patterned panel on the multi-pattern calibration rig, in accordance with the invention as a screen shot diagram.

FIG. 1H demonstrates an embodiment 18 of a user interface 181 of a computer program product showing an identified position 182 of each patterned panel 153 on the multi-pattern calibration rig 152, in accordance with the invention as a screen shot diagram. After the contour groups 172 are determined, the position 182 of each pattern (and in turn that of each patterned panel 153) is defined by the position of the convex hull 183 of the contour groups 172. The position 182 of each patterned panel 153 is represented by the convex hull 183 in the shape of a border around the calibration pattern 155 of each patterned panel 153. As shown in the FIG. 1H, each of the patterned panels 153 is identified despite of any variations caused by noise and/or changes in illumination conditions.

Any features of embodiment 18 may be readily combined or permuted with any of the other embodiments 11, 12, 13, 14, 15, 16, 17, 20, 21, 30, 40, 50, 60, 71, 72, 81, 82, 83, 91, 92, and/or 93 in accordance with the invention.

Figure 2A:
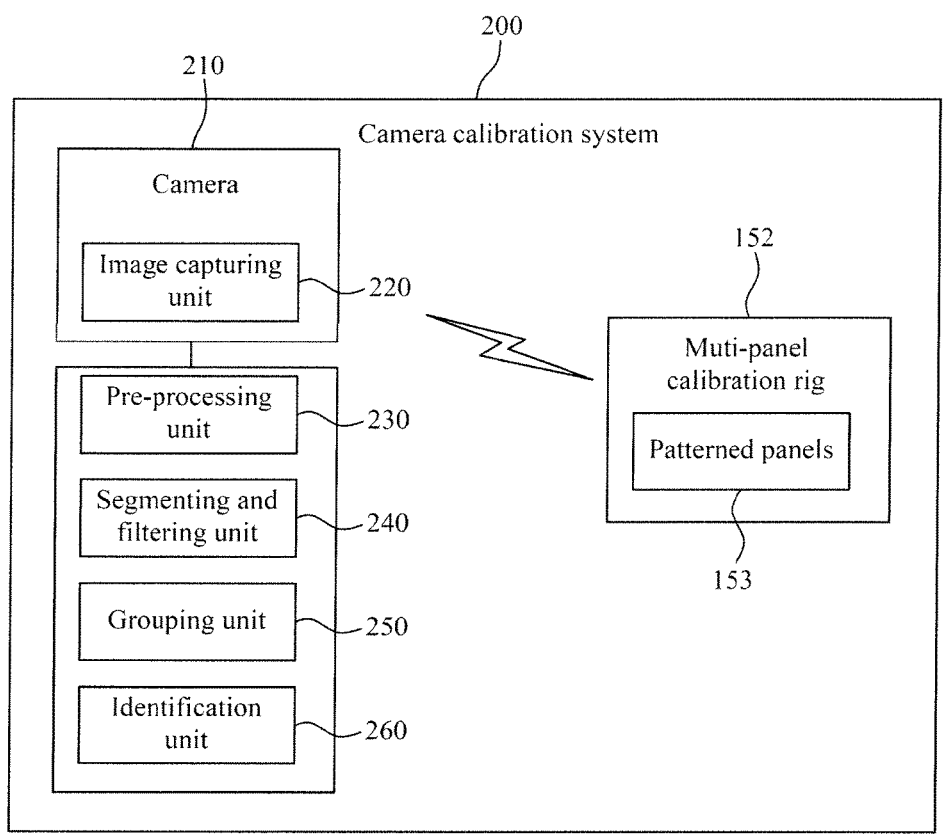
FIG. 2A demonstrates an embodiment 20 of a camera calibration system, in accordance with the invention as a block diagram.

FIG. 2A demonstrates an embodiment 20 of a camera calibration system 200, in accordance with the invention as a block diagram. The camera calibration system 200 comprises the multi-pattern calibration rig 152 having multiple patterned panels 153, and the camera 210 installed in the autonomous vehicle. In an embodiment, the autonomous vehicle may comprise multiple cameras positioned at different locations in the autonomous vehicle, but for the sake of brevity, only one camera 210 is shown in the FIG. 2A. The camera 210 depicted has an image capturing unit 220, and is connected to a computer device having a pre-processing unit 230, a segmenting and filtering unit 240, a grouping unit 250, and an identification unit 260. Of course, the computer device or its particular units can also be implemented as a software or as a hardware/software product, and those can also be implemented in a distributed manner, e.g. on a cloud or on a network.

The image capturing unit 220 is configured to capture an image of the multi-pattern calibration rig 152 comprising the patterned panels 153. The captured image is used as an input image 154 for performing the calibration of the camera 210. Each patterned panel 153 has the calibration pattern 155 such as, a checkerboard pattern that may be used to calibrate the camera 210 of the autonomous vehicle. The calibration pattern 155 comprising the calibration shapes 156, for example, black or white squares, forms a foreground of the input image 154. Remaining objects in the input image 154 form a background. The pre-processing unit 230 pre-processes the image to segment the imaged calibration shapes 156 from the background.

The segmenting and filtering unit 240 segments and filters the contours 162 of the imaged calibration shapes 156. In an example, the contours 162 associated with different calibration shapes 156 may be defined by an area, a boundary, etc. The grouping unit 250 builds groups from coherent contours 162 based on their shape and/or relative distance. In an example, the grouping unit 250 may use the nearest neighboring clustering algorithm for building the contour groups 172. The identification unit 260 identifies the positions 182 of the patterns in the image (and in turn those of the patterned panels 153 present on the multi-pattern calibration rig 152) based on the contour groups 172. Each contour group 172 is represented with the convex hull that is used to identify the position 182 of each pattern in the image.

Although the description herein is provided with reference to the camera calibration system 200 comprising the units 220, 230, 240, 250, and 260 for performing the calibration of the camera 210, it is to be understood that the camera calibration system 200, in another embodiment, may be implemented by a processing unit (not shown) in collaboration with the units 220, 230, 240, 250, and 260 or by a stand-alone processing unit (not shown) for performing the calibration of the camera 210.

Any features of embodiment 20 may be readily combined or permuted with any of the other embodiments 11, 12, 13, 14, 15, 16, 17, 18, 21, 30, 40, 50, 60, 71, 72, 81, 82, 83, 91, 92, and/or 93 in accordance with the invention.

Figure 2B:
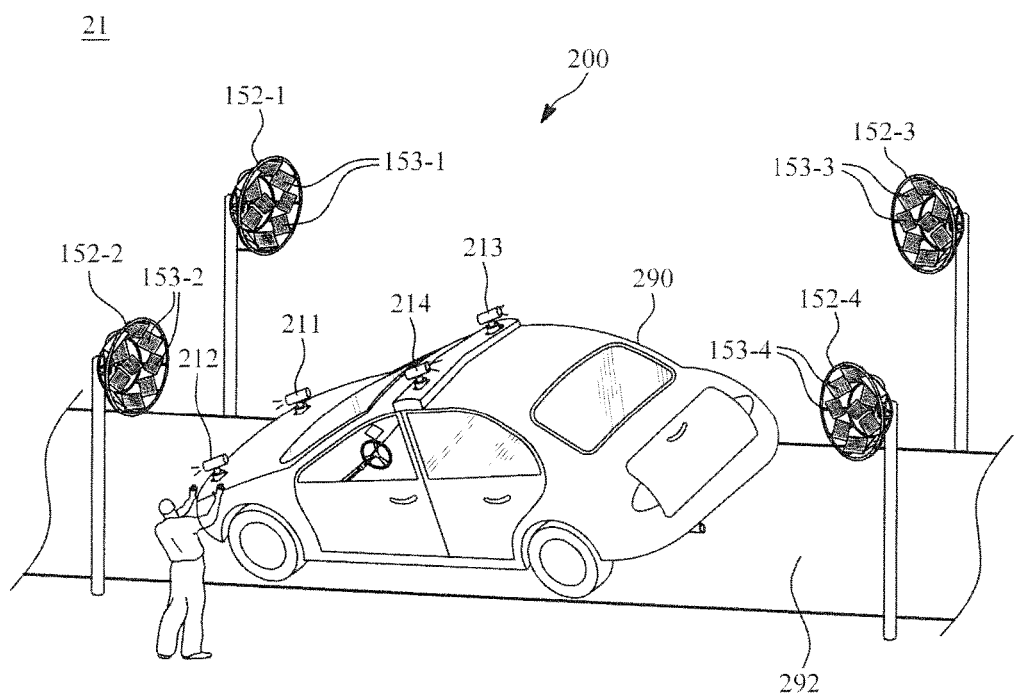
FIG. 2B demonstrates a schematic view of an embodiment 21 of a camera calibration system, in accordance with the invention.

FIG. 2B demonstrates an embodiment 21 of a camera calibration system 200, in accordance with the invention. The camera calibration system 200 comprises the autonomous vehicle 290 comprising multiple cameras 211, 212, 213, and 214 and multiple multi-pattern calibration rigs 152-1, 152-2, 152-3, and 152-4. In an example implementation, the autonomous vehicle 290 is assembled on a conveyor belt system 292 of an automotive assembly plant.

In some embodiments, the camera calibration system 200 comprises a cloud server network (not shown) communicatively coupled to the autonomous vehicle 290 through a communication network (not shown). The cloud server network, which may include an input-output device, usually comprises a monitor (display), a keyboard, a mouse and/or touch screen. However, typically there is more than one computer server in use at one time, so some computers may only incorporate the computer itself, and no screen and no keyboard. These types of computers are typically stored in server farms, which are used to realize the cloud network used by the camera calibration system 200 of the invention. The cloud server network can be purchased as a separate solution from known vendors such as Microsoft and Amazon and HP (Hewlett-Packard). The cloud server network typically runs Unix, Microsoft, iOS, Linux or any other known operating system, and comprises typically a microprocessor, memory, and data storage means, such as SSD flash or Hard drives. To improve the responsiveness of the cloud architecture, the data is preferentially stored, either wholly or partly, on SSD i.e. Flash storage. This component is either selected/configured from an existing cloud provider such as Microsoft or Amazon, or the existing cloud network operator such as Microsoft or Amazon is configured to store all data to a Flash based cloud storage operator, such as Pure Storage, EMC, Nimble storage or the like. Using flash as the backbone storage for the cloud server network is preferred despite its high cost due to the reduced latency that is required and/or preferred for operating the camera calibration system 200 for calibrating the cameras 211, 212, 213, and 214 of the autonomous vehicle 290 using the multi-pattern calibration rigs 152-1, 152-2, 152-3, and 152-4.

The autonomous vehicle 290 is essentially a driverless car. In other examples, the autonomous vehicle 290 may be a truck, any two-wheeled or four-wheeled vehicle, a quadcopter or a drone, etc. The autonomous vehicle 290 may be used for transporting people and objects in traffic. The autonomous vehicle 290 can also assist the driver in adjusting the driving to traffic congestion, ensuring pedestrian safety, detecting potholes in a navigation path of the autonomous vehicle 290, alerting the driver on lane departure and so forth, in accordance with the invention.

The cameras 211, 212, 213, and 214 are positioned, for example, on a hood of the autonomous vehicle 290 facing in the direction of movement of the autonomous vehicle 290 and on a roof of the autonomous vehicle 290 facing in a direction opposite to the direction of movement of the autonomous vehicle 290. Each multi-pattern calibration rig 152-1, 152-2, 152-3, and 152-4 is positioned in front of the camera 211, 212, 213, and 214 of the autonomous vehicle 290 respectively, such that the multi-pattern calibration rigs 152-1, 152-2, 152-3, and 152-4 are facing the respective cameras 211, 212, 213, and 214 and the patterned panels 153-1, 153-2, 153-3, and 153-4 of the multi-pattern calibration rigs 152-1, 152-2, 152-3, and 152-4 cover a field of view of respective cameras 211, 212, 213, and 214.

Any features of embodiment 21 may be readily combined or permuted with any of the other embodiments 11, 12, 13, 14, 15, 16, 17, 18, 20, 30, 40, 50, 60, 71, 72, 81, 82, 83, 91, 92, and/or 93 in accordance with the invention.

Figure 3:
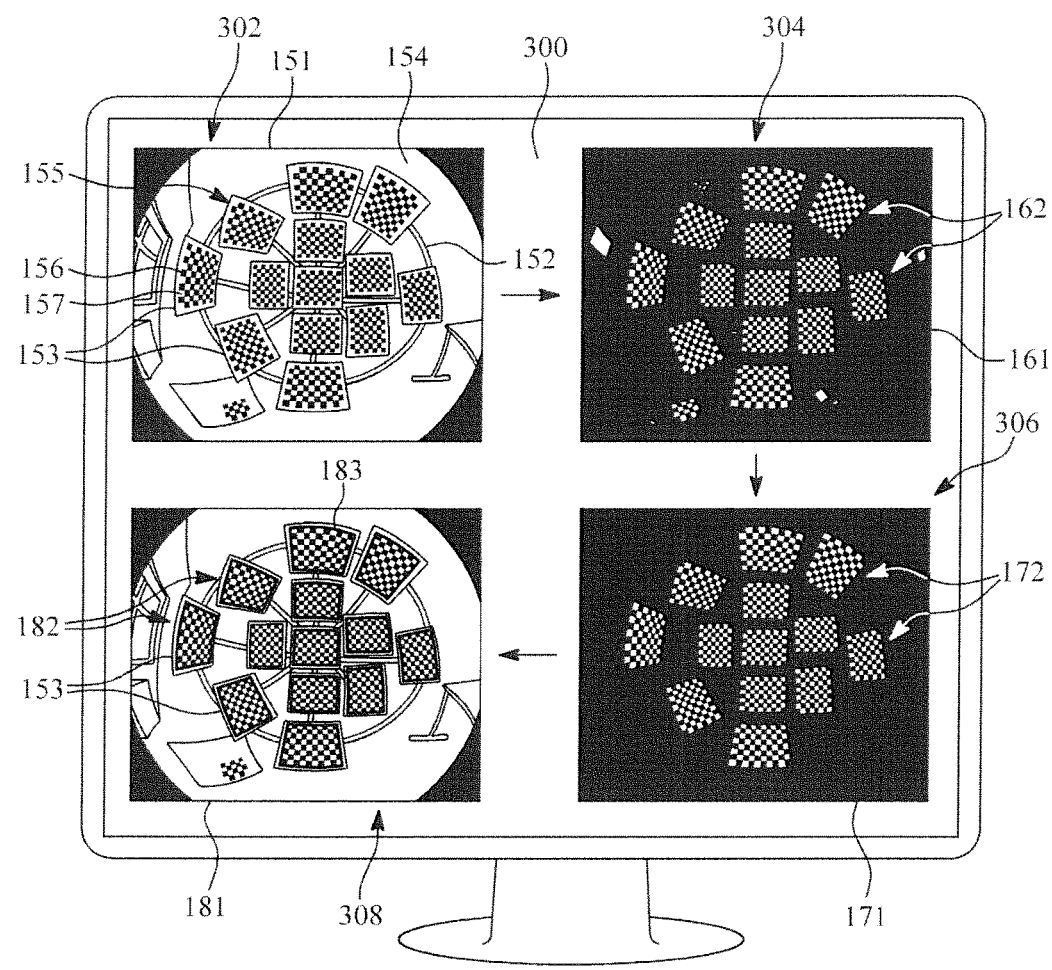
FIG. 3 demonstrates an embodiment 30 of a user interface of a computer program product showing calibration of the camera of the autonomous vehicle, in accordance with the invention as a screen shot diagram.

FIG. 3 demonstrates an embodiment 30 of a user interface 300 of a camera calibration computer program product showing the calibration of the camera 210 of the autonomous vehicle 290, in accordance with the invention as a screen shot diagram. The camera calibration computer program product, stored in a non-transitory computer-readable medium, is configured to calibrate the camera 210 with the multi-pattern calibration rig 152 comprising repetitive patterns of calibration shapes 156. In an example, the user interface 300 is displayed on a display screen positioned on a dashboard of the autonomous vehicle 290. The user interface 300 of the embodiment 30 relates to an identical or similar system 200 as described in FIG. 2A, FIG. 2B, and FIG. 5 of the embodiments 20, 21, and 50, respectively.

The computer program product is stored on a non-transient memory medium either on the autonomous vehicle 290 or on a network host (not shown), or distributed between the two, so that some parts reside on the autonomous vehicle 290 and some parts of the computer program product reside on the network host. The network used for communication between the autonomous vehicle 290 and the network host in the invention is the wireless Internet or the telephony network, which is typically a cellular network such as UMTS—(Universal Mobile Telecommunication System), GSM—(Global System for Mobile Telecommunications), GPRS—(General Packet Radio Service), CDMA—(Code Division Multiple Access), 3G-, 4G-, Wi-Fi and/or WCDMA (Wideband Code Division Multiple Access)-network. The computer program product comprises camera software configured to calibrate the camera 210 of the autonomous vehicle 290. In one exemplary embodiment, a computing device positioned on the dashboard of the autonomous vehicle 290 is configured to have an application installed that allows a user to view different stages involved in the calibration of the camera 210. The application user interface could be the aforementioned user interface 300.

The different stages 302, 304, 306, and 308 involved in the calibration of the camera 210 are shown in FIG. 3. In the stage 302, an input image 154 captured by the camera 210 is shown in the user interface 151. The input image 154 is of the multi-pattern calibration rig 152 holding the patterned panels 153 comprising the calibration patterns 155. In the stage 304, the input image 154 is pre-processed to segment imaged calibration shapes 156 from a background of the input image 154. The calibration shapes 156 are formed by black squares on the white checkerboard patterned panel 153. In the stage 304, contours 162 of the imaged calibration shapes 156 are segmented and filtered. In the stage 306, groups 172 are built from coherent contours 162 based on a shape and a position of each contour 162. In the stage 308, a position 182 of each pattern is identified based on the contour groups 172. In an embodiment, the position 182 of each pattern is identified by the convex hull 183 surrounding the contour groups 172.

Any features of embodiment 30 may be readily combined or permuted with any of the other embodiments 11, 12, 13, 14, 15, 16, 17, 18, 20, 21, 40, 50, 60, 71, 72, 81, 82, 83, 91, 92, and/or 93 in accordance with the invention.

Figure 4A:
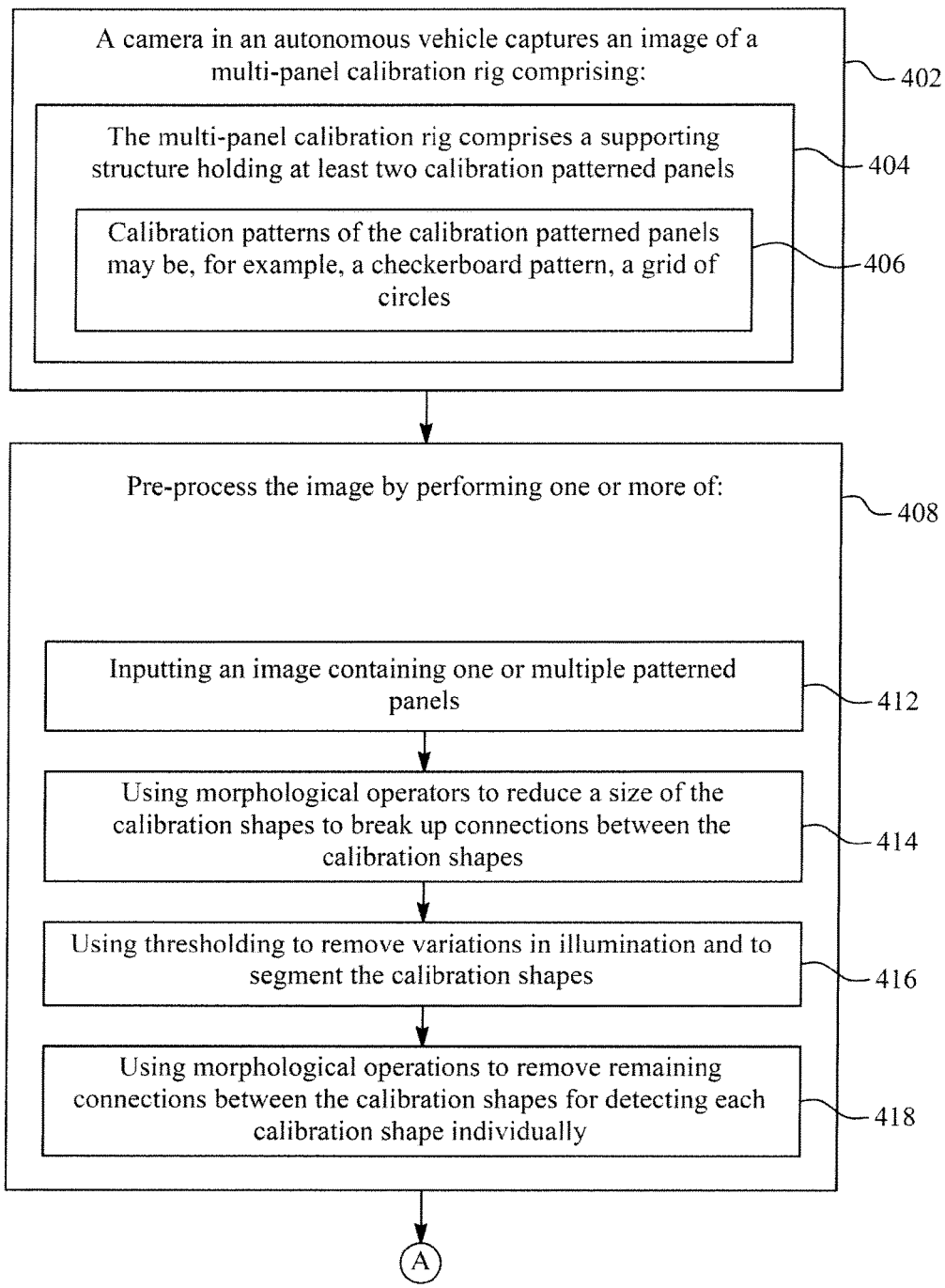
FIGS. 4A-4B demonstrate an embodiment 40 of a more elaborate method for calibrating the camera of an autonomous vehicle with a multi-pattern calibration rig, in accordance with the invention as a flow diagram.
Figure 4B:
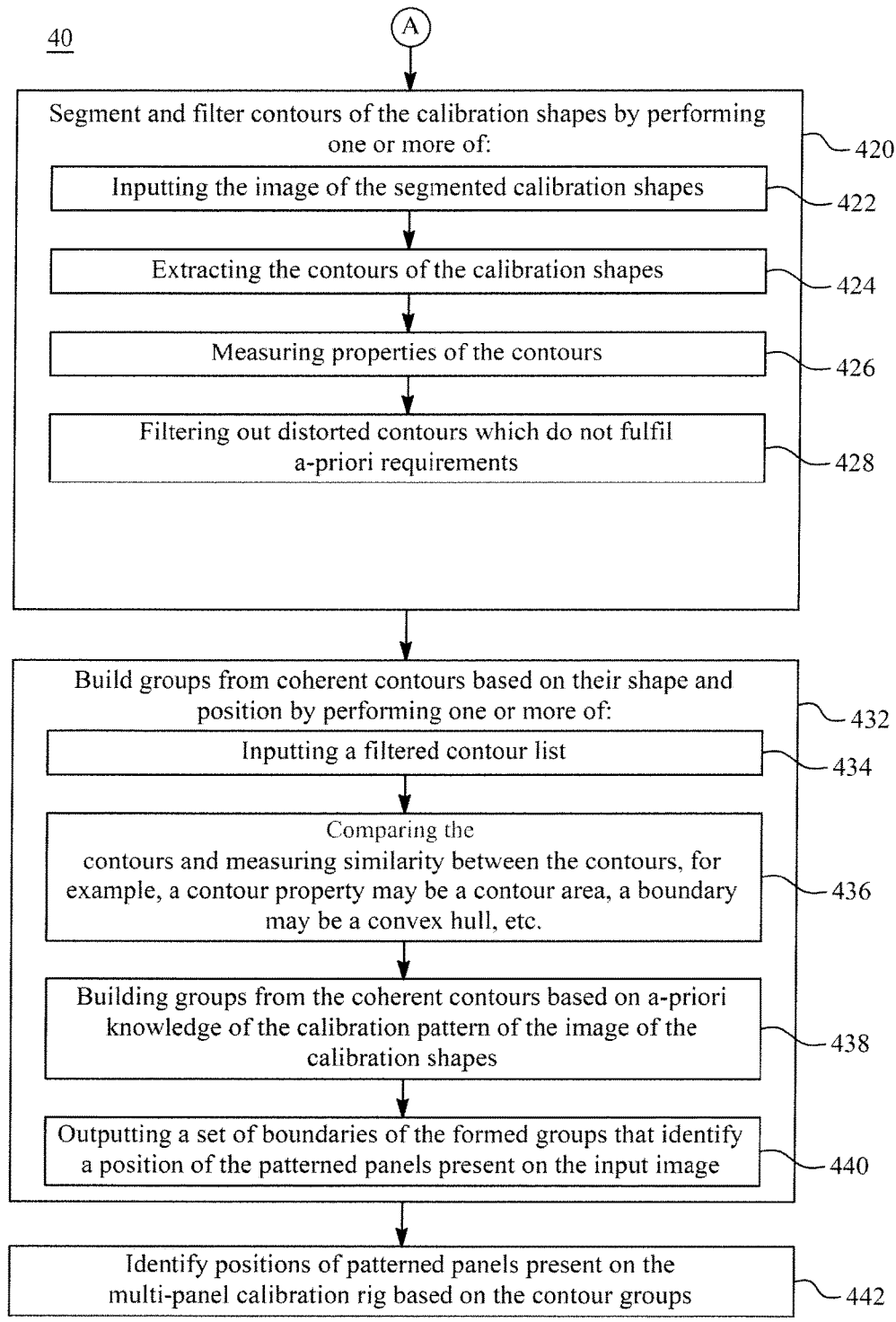

FIGS. 4A-4B demonstrate an embodiment 40 of a more elaborate method for calibrating the camera 210 of the autonomous vehicle 290 with the multi-pattern calibration rig 152, in accordance with the invention as a flow diagram. The method could be implemented in a system identical or similar to embodiment 20, 21, or 50 in FIG. 2A, FIG. 2B, or FIG. 5 for example, as discussed in the other parts of the description. An end-user of the method could use a user interface identical or similar to that disclosed with embodiments 15, 16, 17, 18, 30, 60, and 72 in FIGS. 1E, 1F, 1G, 1H, 3, 6, and 713 respectively.

In step 402, the input image 154 is captured by the camera 210 of the autonomous vehicle 290. The input image 154 contains images of each patterned panel 153 placed on the multi-pattern calibration rig 152. In step 404, the multi-pattern calibration rig 152 is used that comprises a supporting structure holding at least two calibration patterned panels 153. In an example 406, the calibration patterns 155 of the patterned panels 153 may be, for example, a checkerboard pattern, a grid of circles, etc. In an example, the input image 154 is a grayscale or a binary image of a checkerboard pattern comprising black and white squares along with some amount of noise.

In step 408, the input image 154 is pre-processed. In step 412, the input image 154 comprising the imaged calibration shapes 156 is inputted. In step 414, morphological operators are used to reduce a size of each calibration shape 156. The reduction of the size of the calibration shapes 156 facilitates breaking of connections between neighboring calibration shapes 156. In step 416, a thresholding operation such as, adaptive thresholding is performed to remove variations in illumination present in the input image 154. The imaged calibration shapes 156 are further segmented by the thresholding operation. In step 418, another set of further morphological or image processing operations are applied to the input image 154 to remove any remaining connections between the imaged calibration shapes 156. By applying the abovementioned morphological operations and the thresholding operations, each imaged calibration shape 156 is detected in the input image 154 as an individual shape. In this example, the calibration shapes 156 are detected as white squares on the patterned panels 153.

As shown in the FIG. 4B, in step 420, the pre-processed image is segmented and filtered to generate the contours 162. In step 422, the input image 154 comprising the segmented calibration shapes 156 is used. In step 424, the contours 162 of the calibration shapes 156 are extracted. In step 426, properties of the contours 162 are measured. In step 428, the contours are filtered based on the contour properties and/or a-priori knowledge of calibration shapes 156. In an example, the presence of calibration shape noise generates false and/or distorted contours. The contours are filtered to remove the false and/or distorted contours that do not match the contour properties and/or the a-priori knowledge of the calibration shapes 156. An image is generated comprising a set of contours 162 found on the input image 154, based on the segmenting and filtering of the pre-processed image.

In step 432, the contour groups 172 are built from sets of coherent contours 162 and/or the a-priori knowledge of corresponding calibration patterns 155. In step 434, a filtered contour list is used for building the contour groups 172. In an example, neighboring contours 162 are considered to be similar even if high distortion is in the image. In an example, a nearest neighbor clustering algorithm may be used for building the contour groups 172. In step 436, the contours 162 are compared and similarity between the contours 162 is measured.

In step 438, the coherent contours 162 are grouped based on, for example, the a-priori knowledge of calibration patterns 155, contour properties, etc. In an example, the a-priori knowledge of the calibration pattern 155 may comprise a geometry of calibration shapes 156, a geometric layout defining how the calibration shapes 156 are positioned with respect to each other to form a final calibration pattern 155, the a-priori knowledge of neighboring calibration shapes 156 having similar geometry despite any distortion caused by the camera's lens, a count of the calibration shapes 156 building a calibration pattern 155, etc. In an example, the contour properties may comprise an area of a contour 162, a contour boundary such as the convex hull 183, etc. The contour properties are used to compare and measure similarities between multiple contour members 162. In an embodiment, the contours 162 with a predetermined measure of similarity are grouped together. In an embodiment, the count of contours 162 in a group 172 is determined considering missing calibration shapes 156, additional contours 162 due to noise, etc.

Consider an example of building contour groups 172. The contours 162 are processed and filtered after separating connections between the imaged calibration shapes 156. A perimeter of a "c" contour 162 is "P(c)" and an area thereof is "A(c)". A shape parameter of the contour 162 is defined as:

$$R(c) = \frac{P(c)^2}{A(c)} \quad \text{Equation (1)}$$

i.e. the shape parameter is obtained by dividing the square of the perimeter of the contour by the area of the contour.

In an example, the ratio R(c) is a scale invariant measure. The value of R(c) is 16 in case of square shaped calibration shapes 156 and $4\pi$ in case of circular calibration shapes, as disclosed below:

$$R_{square} = \frac{(4a)^2}{a^2} = 16 \quad \text{Equation (2)}$$

$$R_{circle} = \frac{(2r\pi)^2}{r^2\pi} = 4\pi \quad \text{Equation (3)}$$

The generated contours 162 are pre-filtered for removing distorted or inappropriate contours 162. In an example, a contour 162 is considered valid during the filtering when a value of R(c) is in the range of about 2.5 to 25. In this example, a wider range of R(c) is used as, in the case of small contours 162 the value of R(c) may be more distorted attributed by, for example, sharp angles, perspective effects, etc. In another example, that may also be combined with the above one, a contour 162 is considered valid if a value of A(c) as a shape parameter is smaller than 2% of the input image 154 and is larger than 10 pixels. Thus, a contour is accepted as a valid contour only if its shape parameter is within a predetermined range.

Further, a distance between two contours 162 is defined as a distance of their closest points. An enclosing radius r of a contour c 162 is calculated by the equation given below:

$$r(c) = 2\sqrt{2}\sqrt{\frac{A(c)}{P(c)}} \quad \text{Equation (4)}$$

A similarity s of the area and radius of the calibration shapes is calculated by the equation given below:

$$s(x_1, x_2) = \frac{\min(x_1, x_2)}{\max(x_1, x_2)} \quad \text{Equation (5)}$$

Two contours 162 $c_i$ and $c_j$ are considered to belong to a same group if:
$s(A(c_i),A(c_j)) > 0.5$
$s(r(c_i),r(c_j)) > 0.5$
$dist(c_i,c_j) < 1.5 \cdot \max(r(c_i),r(c_j))$
i.e. if
the smaller one of the two areas is larger than 50% of the other area;
the smaller one of the two radii is larger than 50% of the other radius; and
the distance of the closest points of the contours is less than 150% of the larger one of the two radii.

In this example, the similarity s of the area and the radius of the calibration shapes of the two contours 162 is independent of the scale of the calibration shapes, while the distance of the two contours 162 is dependent on the properties of the calibration pattern 155. However, our experiments have shown that the distance criteria above is suitable for all practically applicable repetitive calibration patterns, e.g. to those depicted in FIGS. 9A to 9C.

In step 440, the contour groups 172 are displayed as a set of boundaries of the formed groups 172 that identify a position 182 of the patterns in the input image 154. For example, the contour groups 172 are displayed using the convex hulls 183 that are used to identify a position 182 of each pattern in the input image 154. In step 442, once the position 182 of the calibration target i.e., the pattern is identified, it is easier to locate corners of the patterns. The remaining parts of the input image 154 may be excluded thereby reducing noise in the input image 154.

Any features of embodiment 40 may be readily combined or permuted with any of the other embodiments 11, 12, 13, 14, 15, 16, 17, 18, 20, 21, 30, 50, 60, 71, 72, 81, 82, 83, 91, 92, and/or 93 in accordance with the invention.

Figure 5:
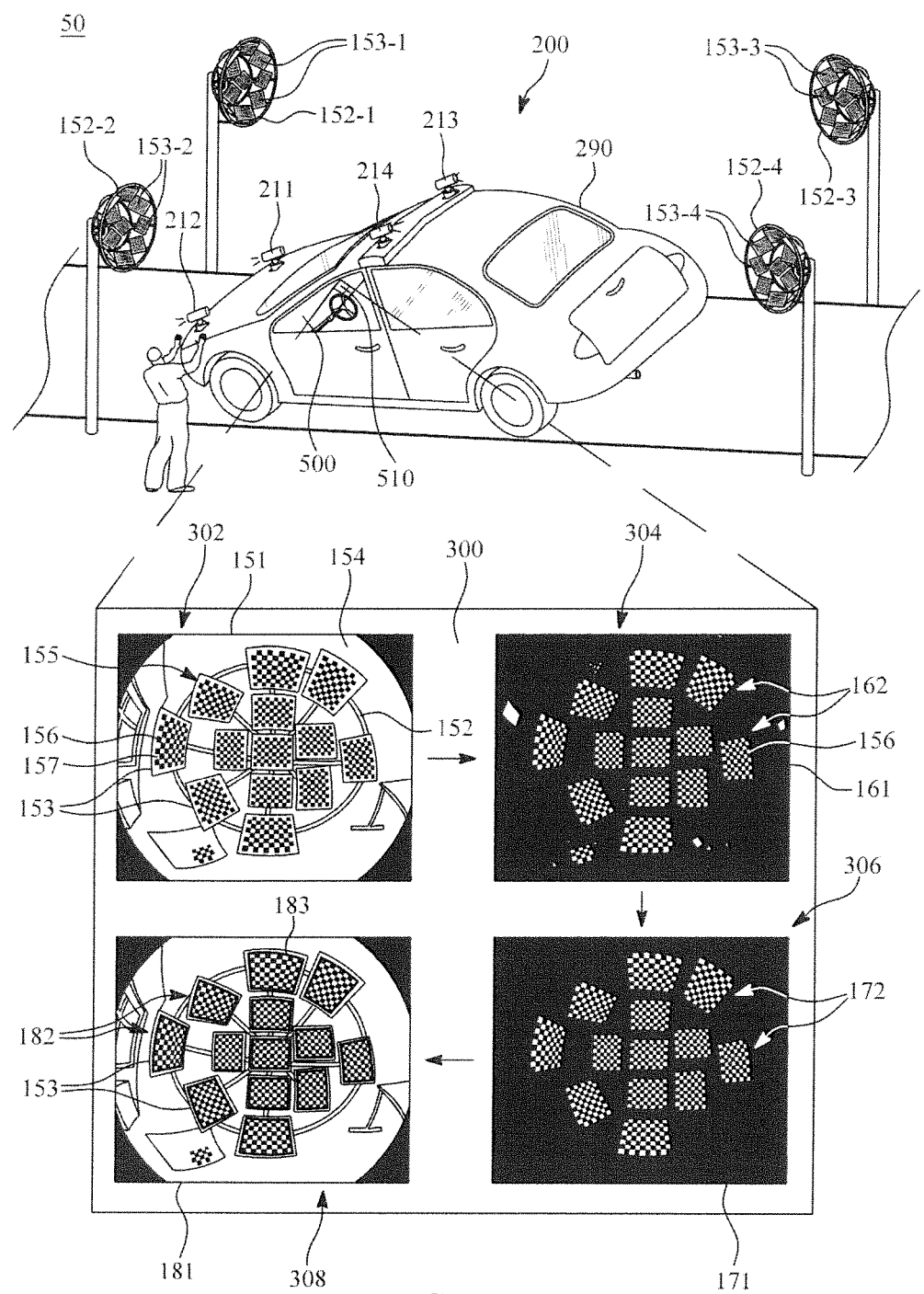
FIG. 5 demonstrates another embodiment 50 of a more elaborate camera calibration system with different camera calibration stages displayed on a dashboard of the autonomous vehicle, in accordance with the invention.

FIG. 5 demonstrates another embodiment 50 of a more elaborate camera calibration system 200 with different camera calibration stages 302, 304, 306, and 308 displayed on a dashboard 500 of the autonomous vehicle 290, in accordance with the invention. The camera calibration system 200 comprises multiple cameras 211, 212, 213, and 214 positioned on the autonomous vehicle 290 and multiple multi-pattern calibration rigs 152-1, 152-2, 152-3, and 152-4 comprising the patterned panels 153-1, 153-2, 153-3, and 153-4.

For the sake of brevity, the stages 302, 304, 306, and 308 involved in the calibration of only one camera, for example, 211 is displayed on the dashboard 500 of the autonomous vehicle 290. In the stage 302, an input image 154 captured by the camera 211 is shown in the user interface 151. The input image 154 is of the multi-pattern calibration rig 152 holding the patterned panels 153 comprising the calibration patterns 155. In the stage 304, the input image 154 is pre-processed to segment imaged calibration shapes 156 from a background 157 of the input image 154. The calibration shapes 156 are formed by black squares on the white checkerboard patterned panel 153. In the stage 304, contours 162 of the imaged calibration shapes 156 are segmented and filtered. In the stage 306, groups 172 are built from coherent contours 162 based on a shape and a position of each contour 162. In the stage 308, a position 182 of each patterned panel 153 present on the multi-pattern calibration rig 152 is identified based on the contour groups 172. In an embodiment, the position 182 of each patterned panel 153 is identified by the convex hull 183 surrounding the contour groups 172.

Any features of embodiment 50 may be readily combined or permuted with any of the other embodiments 11, 12, 13, 14, 15, 16, 17, 18, 20, 21, 30, 40, 60, 71, 72, 81, 82, 83, 91, 92, and/or 93 in accordance with the invention.

Figure 6:
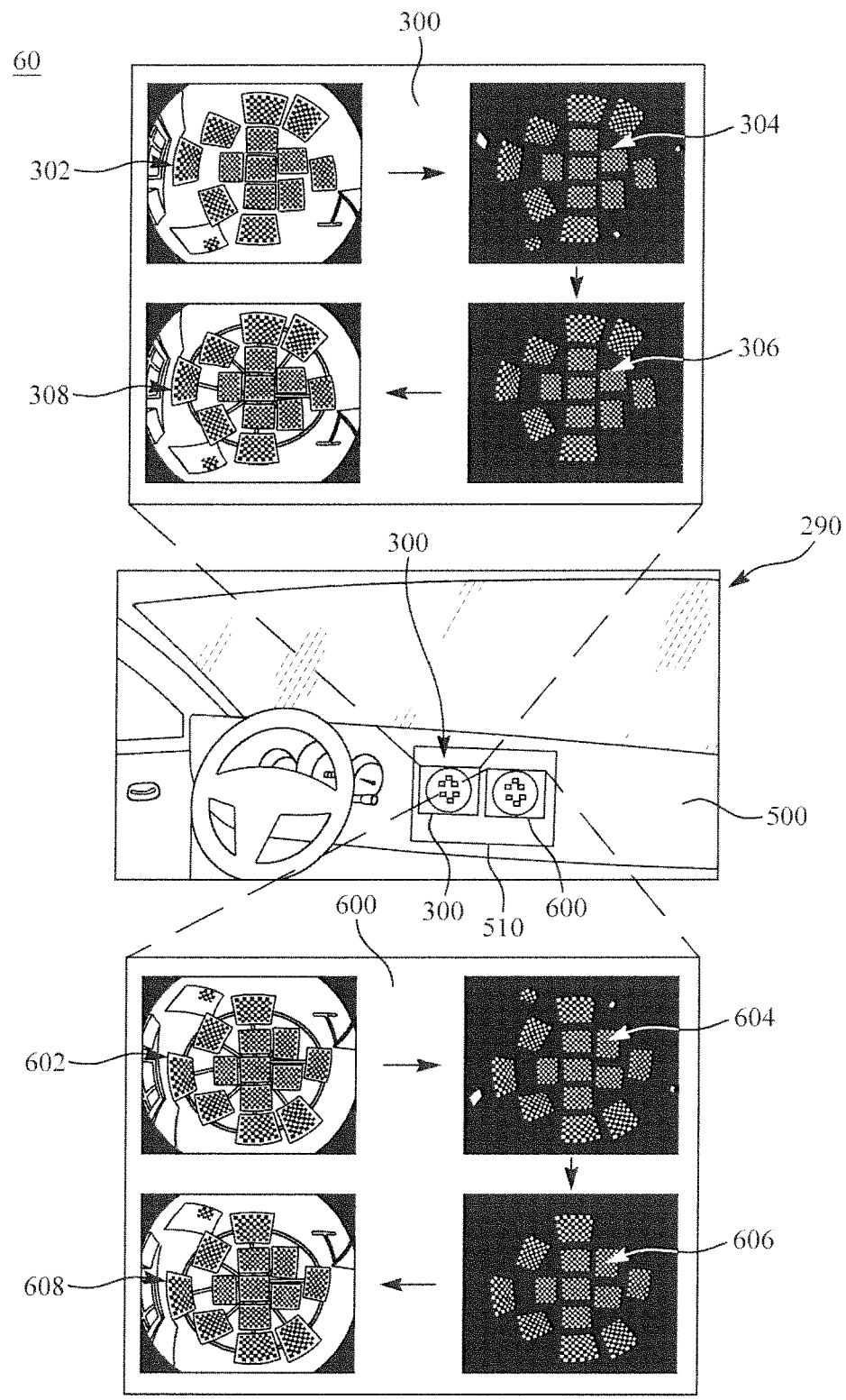
FIG. 6 demonstrates an embodiment 60 of a user interface of a computer program product showing calibration of multiple cameras of the autonomous vehicle, in accordance with the invention as a screen shot diagram.

FIG. 6 demonstrates an embodiment 60 of multiple user interfaces 300, 600 of a computer program product showing the calibration of multiple cameras 210, 211, 212, 213, or 214 of the autonomous vehicle 290, in accordance with the invention as screen shot diagrams. In an example implementation, the dashboard 500 of the autonomous vehicle 290 comprises a screen 510 for displaying the different stages 302, 304, 306, 308, 602, 604, 606, 608 involved in the calibration of two cameras (for example, 211 and 212) positioned on a hood of the autonomous vehicle 290. The user interface 300 shows the stages 302, 304, 306, 308 involved in the calibration of one of the two cameras, for example, 211. The user interface 600 shows the stages 602, 604, 606, 608 involved in the calibration of the other camera, for example, 212. Thus, a technician responsible for the camera calibration can monitor all stages 302, 304, 306, 308, 602, 604, 606, 608 of the camera calibration in real time via the user interfaces 300 and 600.

Any features of embodiment 60 may be readily combined or permuted with any of the other embodiments 11, 12, 13, 14, 15, 16, 17, 18, 20, 21, 30, 40, 50, 71, 72, 81, 82, 83, 91, 92, and/or 93 in accordance with the invention.

Figure 7A:
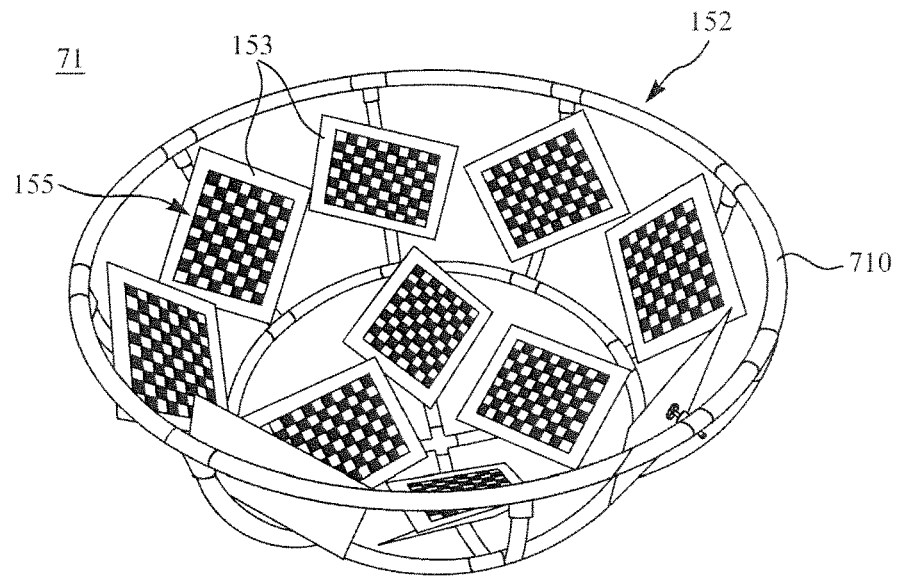
FIG. 7A demonstrates an embodiment 71 of the multi-pattern calibration rig comprising multiple patterned panels, in accordance with the invention.

FIG. 7A demonstrates an embodiment 71 of a multi-pattern calibration rig 152 comprising multiple patterned panels 153, in accordance with the invention as a diagram. The multi-pattern calibration rig 152 comprises a supporting structure 710 designed to securely hold the patterned panels 153 with calibration patterns 155. In an embodiment, each patterned panel 153 is positioned onto the multi-pattern calibration rig 152 according to specifications of a camera to be calibrated. The patterned panels 153 may be attached to the supporting structure 710 in any angle, orientation, etc., by means of agglutination, welding, mounts, etc.

Any features of embodiment 71 may be readily combined or permuted with any of the other embodiments 11, 12, 13, 14, 15, 16, 17, 18, 20, 21, 30, 40, 50, 60, 72, 81, 82, 83, 91, 92, and/or 93 in accordance with the invention.

Figure 7B:
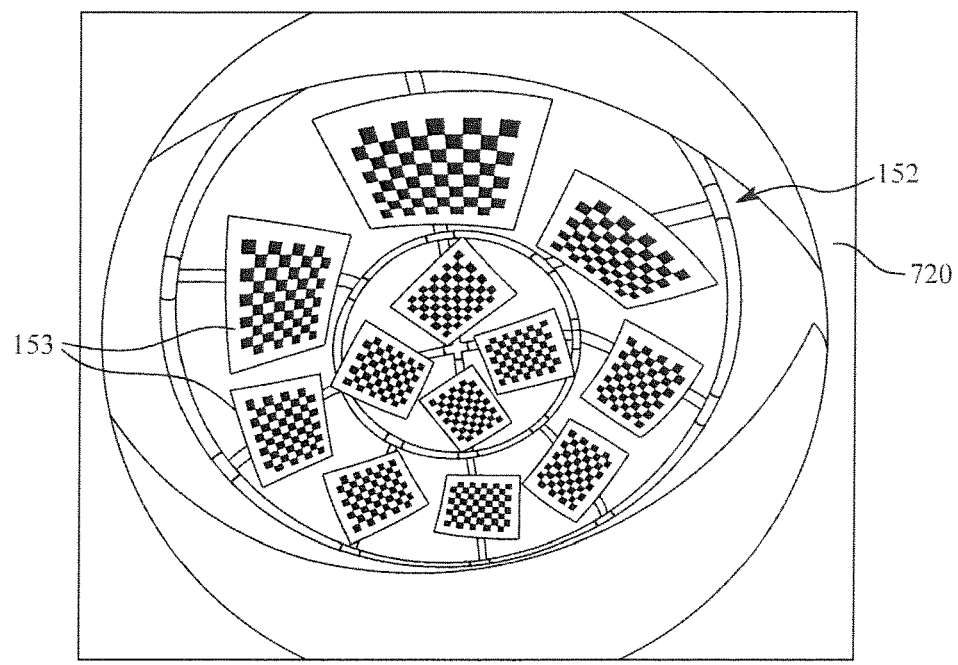
FIG. 7B demonstrates an embodiment 72 of a user interface of a computer program product showing the multi-pattern calibration rig comprising the patterned panels, in accordance with the invention as a screen shot diagram.

FIG. 7B demonstrates an embodiment 72 of a user interface 720 of a computer program product showing the image of the multi-pattern calibration rig 152 comprising the patterned panels 153, in accordance with the invention.

Any features of embodiment 72 may be readily combined or permuted with any of the other embodiments 11, 12, 13, 14, 15, 16, 17, 18, 20, 21, 30, 40, 50, 60, 72, 81, 82, 83, 91, 92, and/or 93 in accordance with the invention.

Figure 8A:
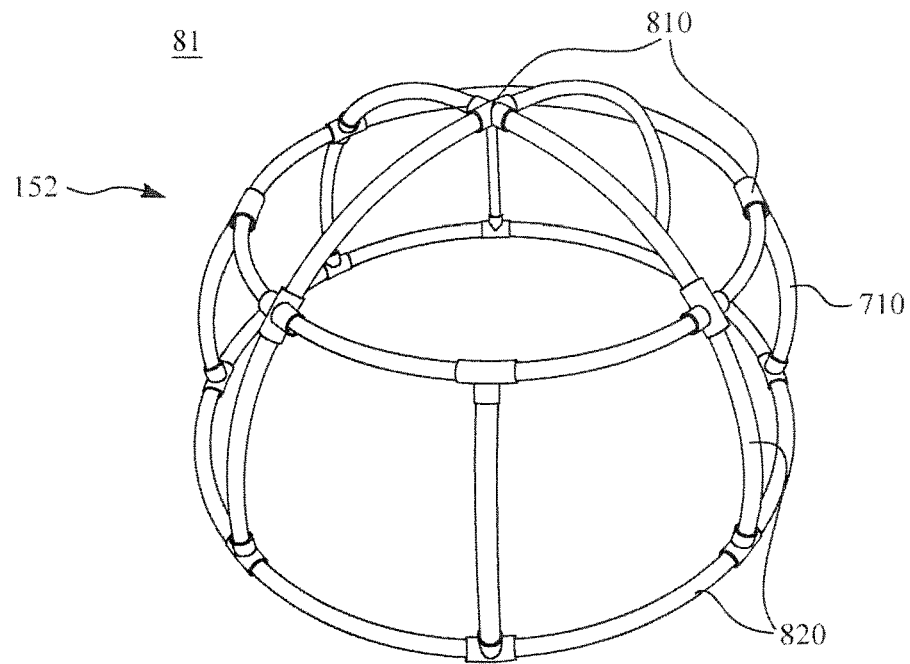
FIG. 8A demonstrates an embodiment 81 of a supporting structure of the multi-pattern calibration rig, in accordance with the invention.

FIG. 8A demonstrates an embodiment 81 of the supporting structure 710 of the multi-pattern calibration rig 152, in accordance with the invention as a diagram. In an example, the supporting structure 710 is made of rods 820, joints 810, etc.

Any features of embodiment 81 may be readily combined or permuted with any of the other embodiments 11, 12, 13, 14, 15, 16, 17, 18, 20, 21, 30, 40, 50, 60, 71, 72, 82, 83, 91, 92, and/or 93 in accordance with the invention.

Figure 8B:
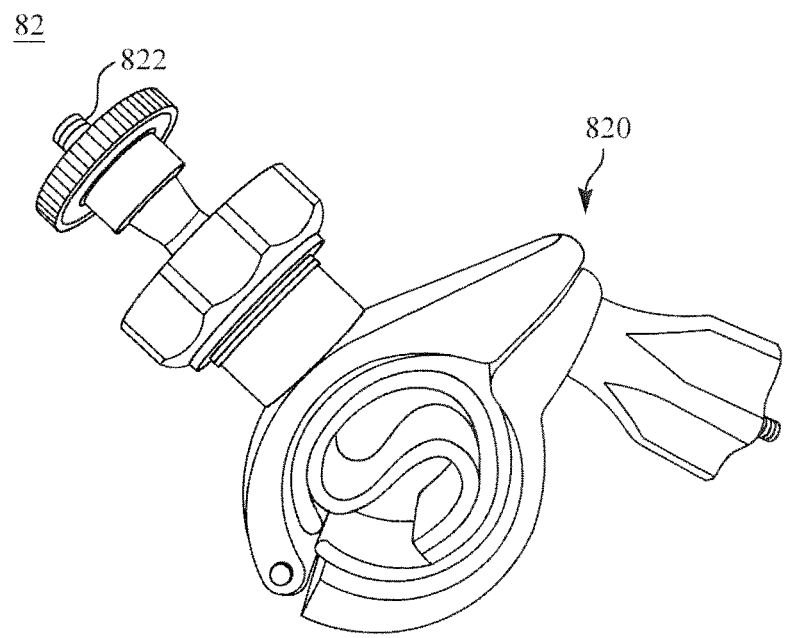
FIG. 8B demonstrates an embodiment 82 of a ball-joint mount of the supporting structure, in accordance with the invention.

FIG. 8B demonstrates an embodiment 82 of a ball-joint mount 820 of the supporting structure 710, in accordance with the invention as a diagram. The ball-joint mount 820 is configured to hold the patterned panels 153 attached to the supporting structure 710. The ball-joint mount 820 may be used for adjusting an angle of the patterned panels 153. The ball-joint mount 820 comprises an attachment point 822 for securely holding the patterned panel 153.

Any features of embodiment 82 may be readily combined or permuted with any of the other embodiments 11, 12, 13, 14, 15, 16, 17, 18, 20, 21, 30, 40, 50, 60, 71, 72, 81, 83, 91, 92, and/or 93 in accordance with the invention.

Figure 8C:
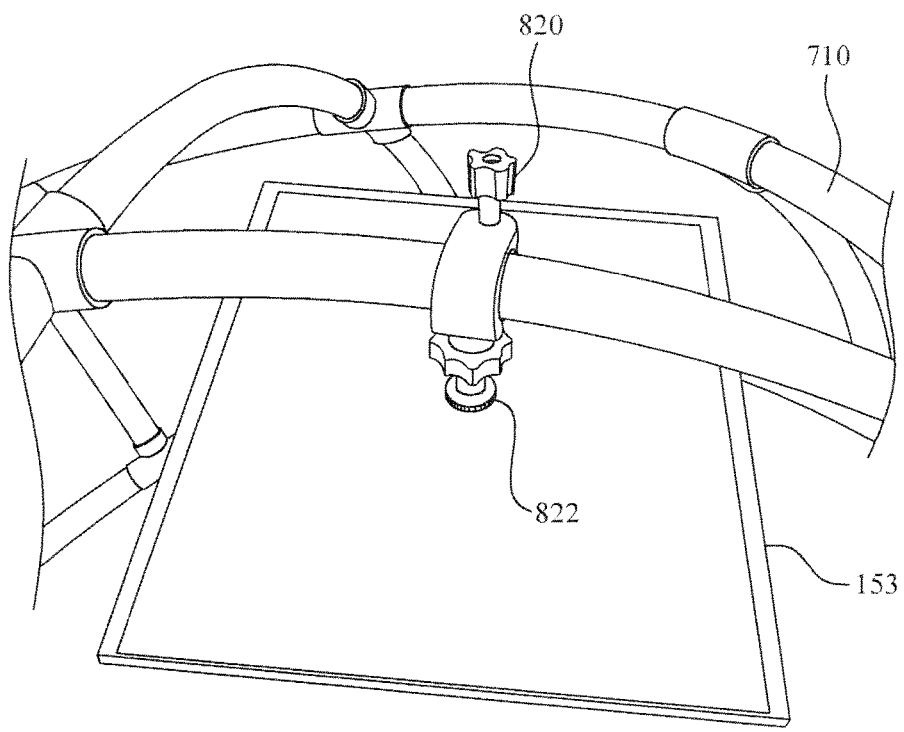
FIG. 8C demonstrates an embodiment 83 of the ball-joint mount of the supporting structure holding a patterned panel, in accordance with the invention.

FIG. 8C demonstrates an embodiment 83 of the ball-joint mount 820 of the supporting structure 710 holding a patterned panel 153, in accordance with the invention as a diagram. The patterned panel 153 is attached to the supporting structure 710 by using the ball-joint mount 820 as shown in FIG. 8C. The patterned panel 153 may be attached in any position and/or angle allowed by the adjusting the ball-joint mount 820. For example, the patterned panel 153 is attached to the supporting structure 710 via the ball-joint mount 820 at the attachment point 822.

Any features of embodiment 83 may be readily combined or permuted with any of the other embodiments 11, 12, 13, 14, 15, 16, 17, 18, 20, 21, 30, 40, 50, 60, 71, 72, 81, 82, 91, 92, and/or 93 in accordance with the invention.

Figure 9A:
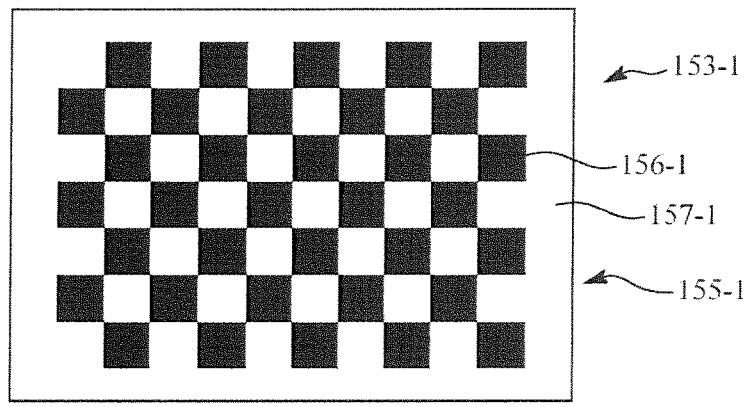
FIGS. 9A-9C demonstrate different embodiments of the calibration patterns 91-93, in accordance with the invention.
Figure 9B:
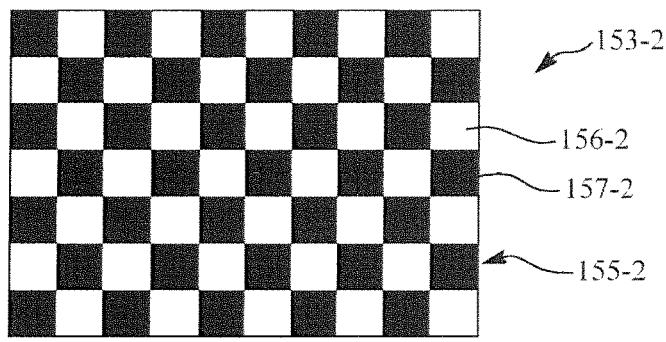
Figure 9C:
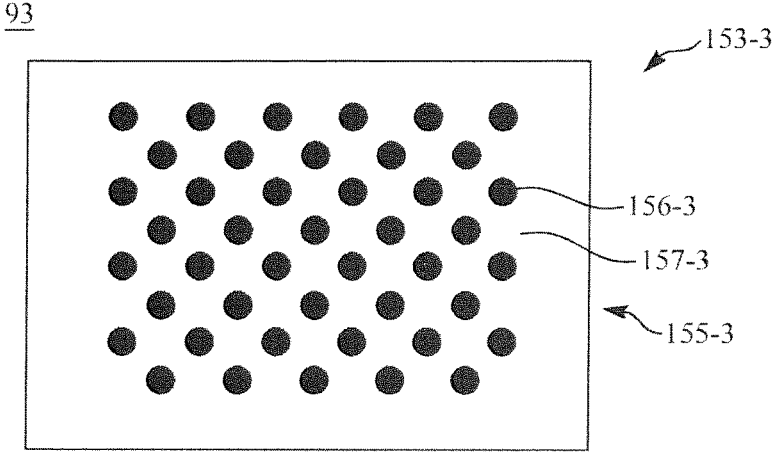

FIGS. 9A-9C demonstrate different embodiments 91, 92, and 93 of calibration patterns 155-1, 155-2, and 155-3, in accordance with the invention as a diagram. Each patterned panel 153-1, 153-2, and 153-3 to be attached to a multi-pattern calibration rig 152 is provided with a repetitive calibration pattern, for example, 155-1, 155-2, or 155-3. The calibration pattern 155-1, 155-2, or 155-3 may be, for example, a checkerboard pattern 155-1 or 155-2 with black or white squares, a grid of circles 155-3 comprising black or white circles, etc. As an example, FIG. 9A demonstrates an embodiment 91 of the patterned panel 153-1 comprising the checkerboard calibration pattern 155-1. The calibration pattern 155-1 comprises black squares 156-1 as calibration shapes on a white board 157-1. In another example, FIG. 9B demonstrates an embodiment 92 of another patterned panel 153-2 comprising a checkerboard calibration pattern 155-2. The calibration pattern 155-2 comprises white squares 156-2 as calibration shapes on a black board 157-2. In another example, FIG. 9C demonstrates another embodiment 93 of another patterned panel 153-3 comprising a grid of circles as the calibration pattern 155-3. The calibration pattern 155-3 comprises black circles 156-3 as calibration shapes on a white board 157-3.

In an embodiment, the characteristics of the calibration patterns 155-1, 155-2, and 155-3 in the patterned panels 153-1, 153-2, and 153-3 is determined based on specifications of the camera 210 to be calibrated. The patterned panels 153-1, 153-2, or 153-3 comprise the calibration patterns 155-1, 155-2, and 155-3 that are repetitive in nature, have obvious features, strong contrast, easily detectable. The patterned panels 153-1, 153-2, and 153-3 may be of any shape or size, for example, square, circle, ellipse, etc. The patterned panels 153-1, 153-2, and 153-3 may be made of, for example, wood, plastic, etc.

Any features of embodiments 91, 92, and 93 may be readily combined or permuted with any of the other embodiments 11, 12, 13, 14, 15, 16, 17, 18, 20, 21, 30, 40, 50, 60, 71, 72, 81, 82, and/or 83 in accordance with the invention.

The invention has been explained in the aforementioned and sizable advantages have been demonstrated. The invention results in faster calibration of the cameras 210 of the autonomous vehicle 290 during assembling of the autonomous vehicle 290. Further, the calibration shapes 156 and the corresponding contours 162 are two-dimensional in nature while corners and edges detection techniques typically used for the camera calibration are one-dimensional in nature. Thus, the calibration shapes 156 and the corresponding contours 162 used for the camera calibration are substantially stable and easily detectable than conventionally used corners and edges that are typically used for the camera calibration. Further, the camera calibration system 200 is substantially tolerant to noise and variations in illumination conditions. Furthermore, the camera calibration system 200 is flexible in using multiple types of calibration patterns 155 for calibrating the cameras 210. Further, the calibration of the cameras 210 of the autonomous vehicle 290 by using a single image 154 of the multi-pattern calibration rig 152 comprising multiple patterned panels 153 reduces time required for image acquisition of multiple calibration patterns 155 separately. Thus, as can be seen, a time-efficient and robust camera calibration process can be used for factory applications.

A camera calibration system is also provided, which comprises at least one camera and a multi-pattern calibration rig, each pattern being repetitive and comprising calibration shapes. The system also comprises a computer device being connected to the at least one camera and being adapted for carrying out the above detailed inventive method steps.

Furthermore, a non-transitory computer-readable medium is also provided for calibrating a camera with a multi-pattern calibration rig, each pattern being repetitive and comprising calibration shapes, wherein the medium comprises instructions stored thereon, that when executed on a processor, perform the above detailed inventive method steps.

The invention has been explained above with reference to the aforementioned embodiments. However, it is clear that the invention is not only restricted to these embodiments, but comprises all possible embodiments within the spirit and scope of the inventive thought and the following patent claims. The multi-pattern calibration rig can consist of more than one support structure, and can carry an arbitrary number of patterns, patterned panels. The invention is suitable for calibrating cameras in any technical application, not only for vehicles.

The invention claimed is:

1. A method for calibrating a camera by using a multi-pattern calibration rig including a plurality of patterns, each pattern being repetitive and comprising a plurality of calibration shapes, the method comprising:
    capturing an image of the multi-pattern calibration rig with the camera,
    segmenting contours of the plurality of calibration shapes,
    calculating areas of the contours,
    building respective groups of at least two coherent contours based on a similarity of an area of each contour in each respective group to the area of one or more other contours in the respective group and a distance of each contour in each respective group from the one or more other contours in the respective group, and
    identifying a position of each pattern in the image based on the respective groups of coherent contours,
    wherein the similarity is determined by:
        comparing the area of one contour in the respective group to the area of another contour in the respective group, and
        determining the two compared areas are similar if a smaller one of the two areas is larger than a predetermined fraction of the other area.

2. The method according to claim 1, wherein any two of the contours, each having an enclosing circle with a respective radius, belong to a same group if at least the following conditions are fulfilled:
    the smaller one of the two areas is larger than 50% of the other area,
    the smaller one of the two radii is larger than 50% of the other radius, and
    the distance of the closest points of the contours is less than 150% of the larger one of the two radii.

3. The method according to claim 1, wherein a group is accepted as a valid group if the number of the contours therein does not differ by more than 10% from the number of the calibration shapes within the respective pattern.

4. The method according to claim 1, wherein identifying the position of each pattern in the image based on the contour groups comprises:
    generating a convex hull for each of the groups, and
    identifying a position of the convex hull of each pattern as the position of the respective pattern in the image.

5. The method according to claim 1, wherein a pre-processing step is carried out on the captured image before segmenting the contours, the pre-processing step comprising:
    segmenting the plurality of calibration shapes from other parts of the image, and thereby generating a binary image in which the other parts of the image are represented with one binary value and the plurality of calibration shapes are represented by the other binary value.

6. The method according to claim 5, wherein the pre-processing step further comprises:
    morphological erosion and dilation for breaking up connections between the plurality of calibration shapes,
    thresholding for removing variations in illumination, and
    detecting and removing bridge pixels for breaking up any remaining connections between the plurality of calibration shapes.

7. The method according to claim 5, wherein a contour filtering step is carried out after segmenting the contours, the contour filtering step comprising:
    calculating a shape parameter for each of the contours, and
    accepting the contour as a valid contour if its shape parameter is within a predetermined range.

8. The method according to claim 7, wherein each contour includes a perimeter that encloses the area of the contour, and the shape parameter is obtained by dividing the square of the perimeter of the contour by the area of the contour, and the predetermined range is at least within 2.5 and 25.

9. The method according to claim 7, wherein the shape parameter is the area of the contour, and the predetermined range is at least between ten pixels and 2% of a total area of the image.

10. The method according to claim 1, wherein each pattern is a checkerboard pattern or a grid of circles.

11. The method according to claim 1, wherein the camera is arranged in a vehicle.

12. A camera calibration system, comprising:
at least one camera,
a multi-pattern calibration rig including a plurality of patterns, each pattern being repetitive and comprising a plurality of calibration shapes, and
a computer device connected to the at least one camera and configured to:
capture an image of the multi-pattern calibration rig with the at least one camera,
segment contours of the plurality of calibration shapes,
calculate areas of the contours,
build respective groups of at least two coherent contours based on a similarity of an area of each contour in each respective group to the area of one or more other contours in the respective group and a distance of each contour in each respective group from the one or more other contours in the respective group, and
identify a position of each pattern in the image based on the respective groups of coherent contours,
wherein the similarity is determined by:
   comparing the area of one contour in the respective group to the area of another contour in the respective group, and
   determining the two compared areas are similar if a smaller one of the two areas is larger than a predetermined fraction of the other area.

13. A non-transitory computer-readable medium for calibrating a camera using a multi-pattern calibration rig including a plurality of patterns, each pattern being repetitive and comprising a plurality of calibration shapes, the medium comprising instructions stored thereon, that when executed on a processor, cause the processor to:
capture an image of the multi-pattern calibration rig with the camera,
segment contours of the plurality of calibration shapes,
calculate areas of the contours,
build respective groups of at least two coherent contours based on a similarity of an area of each contour in each respective group to the area of one or more other contours in the respective group and a distance of each contour in each respective group from the one or more other contours in the respective group, and
identify a position of each pattern in the image based on the respective groups of coherent contours,
wherein the similarity is determined by:
   comparing the area of one contour in the respective group to the area of another contour in the respective group, and
   determining the two compared areas are similar if a smaller one of the two areas is larger than a predetermined fraction of the other area.

\* \* \* \* \*